(12) United States Patent
Gill

(10) Patent No.: US 10,987,744 B2
(45) Date of Patent: Apr. 27, 2021

(54) APPARATUS AND METHODS FOR AUTOMATICALLY TRAINING SAW BLADES ON A SAW MANDREL

(71) Applicant: Kendall Keith Gill, Leesburg, GA (US)

(72) Inventor: Kendall Keith Gill, Leesburg, GA (US)

(*) Notice: Subject to any disclaimer, the term of this patent is extended or adjusted under 35 U.S.C. 154(b) by 13 days.

(21) Appl. No.: 16/540,644

(22) Filed: Aug. 14, 2019

(65) Prior Publication Data

US 2020/0269335 A1   Aug. 27, 2020

Related U.S. Application Data

(60) Provisional application No. 62/808,951, filed on Feb. 22, 2019.

(51) Int. Cl.
*B23D 63/18*   (2006.01)
*D01B 1/08*   (2006.01)

(52) U.S. Cl.
CPC ............... *B23D 63/18* (2013.01); *D01B 1/08* (2013.01)

(58) Field of Classification Search
CPC .................................. B23D 63/18; D01B 1/08
See application file for complete search history.

(56) References Cited

U.S. PATENT DOCUMENTS

| 2,623,414 | A |   | 12/1952 | Senard |
| 3,181,322 | A | * | 5/1965  | Lehacque ............... B23D 63/18 72/18.7 |
| 3,490,101 | A |   | 1/1970  | Fountain |
| 3,795,248 | A |   | 3/1974  | Long |
| 4,085,630 | A |   | 4/1978  | Williams |
| 4,400,851 | A |   | 8/1983  | Hudson |
| 4,457,049 | A |   | 7/1984  | Hudson et al. |
| 4,625,365 | A | * | 12/1986 | Nayfa ..................... D01B 1/08 19/55 R |
| 4,875,393 | A |   | 10/1989 | Williams |
| 5,269,205 | A |   | 12/1993 | Oppliger |
| 2003/0094077 | A1 |   | 5/2003  | Hoffman |
| 2008/0307928 | A1 |   | 12/2008 | Oppliger |
| 2013/0160610 | A1 | * | 6/2013  | Schramm ................ D01B 1/08 76/37 |

FOREIGN PATENT DOCUMENTS

| EP | 3045266    | 7/2016  |
| JP | 2007168308 | 7/2007  |
| JP | 201116226  | 1/2011  |
| WO | 1996038251 | 12/1996 |
| WO | 2007063527 | 6/2007  |

\* cited by examiner

*Primary Examiner* — Omar Flores Sanchez
(74) *Attorney, Agent, or Firm* — Withers & Keys, LLC

(57) ABSTRACT

Apparatus and methods for automatically training (i.e., straightening) saw blades along a saw mandrel are disclosed.

20 Claims, 12 Drawing Sheets though the center measurements vary with model and manufacturer, manufacturers have been required to reduce the center measurement in response to a smaller seed size. For example, one manufacturer uses a spacing of 0.5741 in. between centers (i.e., between centers of saw blades).
APPARATUS AND METHODS FOR AUTOMATICALLY TRAINING SAW BLADES ON A SAW MANDREL

CROSS-REFERENCE TO RELATED APPLICATIONS

This patent application claims the benefit of priority to U.S. Provisional Patent Application Ser. No. 62/808,951 filed on Feb. 22, 2019 and entitled "APPARATUS AND METHODS FOR AUTOMATICALLY TRAINING SAW BLADES ON A SAW MANDREL," the subject matter of which is hereby incorporated by reference in its entirety.

TECHNICAL FIELD

The present invention relates to apparatus and methods for automatically training (i.e., straightening) saw blades along a saw mandrel.

BACKGROUND

Cotton is a plant grown in the warmer climates of the world. It is a fibrous material used to make many types of products including, but not limited to, clothing, towels, paper, etc. When cotton is harvested, it is composed of two parts, (i) the fibrous material called lint, and (ii) the seed. The seed is attached to the lint and must be removed for the lint to be used to make yarn or other products. The process of removing the seed is called ginning.

There are two types of ginning, namely, roller ginning and saw ginning. Extra long staple or long fiber length cottons are roller ginned. This is a gentle way of removing the seed as the lint and seed separate easily. Upland cotton is saw ginned. Saw ginning is a more aggressive procedure, which is needed as the seed is attached firmly to the lint.

The machine that performs saw ginning is called a gin stand. The gin stand consists of a gin saw mandrel, a gin breast, a doffing brush, an application roller, and an agitator or seed tube. Different manufacturers have different names for some of the parts, but the components are all basically the same.

The saw mandrel consists of multiple saw blades on a shaft with each saw blade separated by a spacer positioned between adjacent saw blades. The saw mandrel is threaded on each end and a nut is tightened to push the saws and spacers together and to keep them from moving. Saw mandrels vary in length by model and manufacturer. Saw mandrels are typically from 72.0 inches (in.) to 100.0 in. in length. The saw blades and spacers also vary in diameter and thickness. The saw blades typically have (i) a thickness ranging from about 0.036 in. to about 0.045 in. and (ii) a diameter of from about 12.0 in. to about 18.0 in. The spacers also vary in diameter and thickness. The spacers on any given saw mandrel are smaller in diameter than the saw blades. For example, one manufacturer's mandrel uses twelve-inch diameter saw blades with six-inch diameter spacers.

The gin breast consists of individual vertical members called ribs. The center to center measurement between the gaps in the ribs matches the center to center measurement between the saw blades on the saw mandrel for a particular gin stand. The gap between ribs may vary, but is typically from about 0.090 in. to about 0.125 in.

In the saw ginning process, cotton is grabbed by the teeth on the saw blades and pulled between the ribs. The gap between the ribs is smaller than the seed. Thus, the gin stand separates the cotton fiber from the cotton seed.

As ginning capacity has increased and seed size has been reduced due to new varieties of cotton, the gap between ribs has been getting smaller over the years. Although the center measurements vary with model and manufacturer, manufacturers have been required to reduce the center measurement in response to a smaller seed size. For example, one manufacturer uses a spacing of 0.5741 in. between centers (i.e., between centers of saw blades).

A saw mandrel is assembled by sliding a saw blade and a spacer onto a shaft, and repeating, until all of the saw blades and spacers are on the shaft. A nut is then placed on each threaded end of the shaft and tightened to push the saws and spacers together to keep them tight and to keep them from moving. A template the length of the mandrel with marks for correct spacing is placed on the saw cylinder to check spacing. If needed, the nuts are loosened and shims are intermittently added to match the template as closely as possible. Each saw blade is then individually bent (manually) with a fork bending tool to match each mark on the template. A mark is then drawn along the length of the cylinder at the position of the template. At this one point, the spacing should be correct on the saw mandrel. Although the cylinder (and saw blades positioned thereon) should be correct in this one point, each saw blade must be checked along the 360 degrees of each saw blade. This is needed as the saw blades may have a slight kink in them or an imperfection in one or more space blocks may cause the saw blades to wobble as it rotates in the gin stand. "Training" the saw blades is the process for straightening the blades.

Up until now, training of saw blades has been done with a manual and archaic procedure. Starting at the first blade, a dial indicator is put on the mark that was made with the template. The saw blade is then rotated and as the dial indicator moves to an unacceptable level the saw blade is manually bent with the fork saw training tool until the saw blade is in an acceptable range. This is repeated the entire 360 degrees of the saw blade. This procedure is repeated for each blade on the saw mandrel.

A slight variation of this manual procedure is using a pointer on the alignment mark and slightly off the blade. The saw blade is turned and trained by visual reference of the pointer to the wobble of the blade. Using the dial indicator is a much more accurate method of these two procedures. However, the problem even with the dial indicator method is the accuracy depends on the initial setup using the template. It is using a visual reference for each blade that must be very accurate for the dial indicator to give a true reading. This can be done, but is extremely time-consuming to complete one saw mandrel. Further, due to the time factor, the precise initially accuracy is often overlooked.

The gin operator or gin owner will not know the quality of the "training job" until the saw mandrel is installed in the gin stand. If the saw blades are rubbing the ribs, the saw blades rubbing will have to be manually trained in the gin stand to be clear of the ribs. Rubbing saw blades shorten the life of the saw blades and ribs, and if the rubbing is severe enough, the rubbing can be a fire hazard as cotton is extremely flammable. Further, the horsepower required to turn the mandrel is increased due to friction, and the capacity of the gin stand is decrease.

In view of the above-mentioned shortcomings within the state-of-the-art, the present inventors conceived of (i) the apparatus and (ii) methods of using the apparatus disclosed in U.S. Pat. No. 8,590,109, the contents of which is hereby incorporated by reference in its entirety. The apparatus and methods disclosed in U.S. Pat. No. 8,590,109 address many of the problems with prior machines by providing apparatus and methods for automatically training saw blades along a saw mandrel in an efficient, time-efficient process using various apparatus components and method steps. Although (i) the apparatus and (ii) methods of using the apparatus disclosed in U.S. Pat. No. 8,590,109 provided exceptional value to the state-of-the-art, the present inventors endeavored to provide an even better performing apparatus and methods for automatically training saw blades along a saw mandrel.

As understood by the present inventors, what is needed in the art is an improved and more accurate apparatus and method for effectively automatically training saw blades along a saw mandrel so as to provide an even more exceptional process of automatically training saw blades along a saw mandrel.

SUMMARY

The present invention addresses the need for an improved apparatus and method for automatically training saw blades. The improved apparatus and methods of the present invention enable efficient, cost-effective and accurate training of saw blades, which ultimately results in more efficient and cost-effective separation of cotton fiber from cotton seed.

Accordingly, the present invention is directed to methods of automatically training saw blades along a saw mandrel. In one exemplary embodiment, the method of the present invention comprises a method of automatically training saw blades along a saw mandrel, wherein the method comprises: positioning a gauge comprising (i) a slidable base that moves longitudinally relative to and parallel with the saw mandrel and (ii) left and right gauge contact members extending from the slidable base relative to a first saw blade along the saw mandrel such that the left and right gauge contact members of the slidable base extend along and contact opposite left and right major surfaces of the first saw blade, respectively; and in response to the first saw blade being out of tolerance based on a measured position and longitudinal movement of the slidable base relative to the saw mandrel during rotation of the saw mandrel, bending the first saw blade in a right direction if the first saw blade is in a positive out of tolerance position, and (ii) bending the first saw blade in a left direction if the first saw blade is in a negative out of tolerance position, said bending being facilitated by a bender. The measured position of the left and right gauge contact members is desirably determined by a laser electronic measuring device (LEMD).

In another exemplary embodiment, the method of the present invention comprises a method of automatically training saw blades along a saw mandrel, wherein the method comprises rotating a saw mandrel comprising multiple saw blades spaced from one another along the saw mandrel; and in response to a first saw blade not being out of tolerance based on a measured position of a slidable base that moves longitudinally relative to and parallel with the saw mandrel, as measured by a laser electronic measuring device (LEMD), during at least one complete rotation of the saw mandrel and while the gauge is in an activated position, moving the gauge into a deactivated position via a programmable logic controller; and simultaneously moving the gauge and a bender along the saw mandrel a distance equal to a spacing between adjacent saw blades via the programmable logic controller.

The disclosed methods of automatically training saw blades along a saw mandrel may comprise one or more additional method steps. Suitable additional method steps may include, but are not limited, positioning a bender relative to the first saw blade such that left and right bender contact members of the bender extend along the opposite left and right major surfaces of the first saw blade, respectively, and the first saw blade is between the left and right bender contact members; rotating the saw mandrel; in response to the first saw blade not being out of tolerance based on a measured position of left and right gauge contact members during at least one complete rotation of the saw mandrel, moving the gauge and the bender away from the first saw blade such that the left and right gauge contact members of the gauge and the left and right bender contact members of the bender do not extend along the opposite left and right major surfaces of the first saw blade, simultaneously moving the gauge and the bender along the saw mandrel a distance equal to a spacing between adjacent saw blades, and moving the gauge and the bender toward a second saw blade of the saw mandrel such that the left and right gauge contact members of the gauge and the left and right bender contact members of the bender extend along opposite left and right major surfaces of the second saw blade; in response to the second saw blade being out of tolerance based on a measured position of left and right gauge contact members during rotation of the saw mandrel, bending the second saw blade in a right direction if the second saw blade is in a positive tolerance position, and bending the second saw blade in a left direction if the second saw blade is in a negative tolerance position; and any combination of the disclosed method steps.

The present invention is further directed to apparatus for automatically training saw blades along a saw mandrel. In one exemplary embodiment, the apparatus of the present invention comprises an apparatus for automatically training saw blades along a saw mandrel, wherein the apparatus comprises: a gauge comprising (i) a slidable base that moves longitudinally relative to and parallel with a saw mandrel and (ii) left and right gauge contact members extending from the slidable base, said left and right gauge contact members being positionable along opposite left and right major surfaces of a first saw blade positioned along the saw mandrel such that teeth of the first saw blade are between the left and right gauge contact members; a bender comprising left and right bender contact members, said left and right bender contact members being spaced from one another so as to be positionable on opposite left and right major surfaces of the first saw blade such that teeth (and blade portions just past the teeth) of the first saw blade are between the left and right bender contact members; and a laser electronic measuring device (LEMD) that (i) determines a measured position of the slidable base and (ii) detects longitudinal movement of the slidable base relative to the saw mandrel, wherein in response to the first saw blade being out of tolerance based on the measured position and longitudinal movement of the slidable base relative to the saw mandrel, as measured by the laser electronic measuring device, during rotation of the saw mandrel, said bender being operatively adapted to (i) bend the first saw blade in a right direction if the first saw blade is in a positive out of tolerance position, and (ii) bend the first saw blade in a left direction if the first saw blade is in a negative out of tolerance position.

The apparatus of the present invention may further comprise a number of additional components. Suitable additional apparatus components include, but are not limited to, one or more apparatus components operatively adapted to move the gauge and the bender toward or away from the first saw blade; a support structure operatively adapted to support and allow rotation of a saw mandrel; a first motor and associated connecting components operatively adapted to rotate the saw mandrel when positioned within the support structure; a ball screw extending parallel to the saw mandrel when positioned within the support structure; a movable support structure operatively adapted to (i) support the gauge, the bender and the laser electronic measuring device, and (ii) move along the ball screw; a servo motor and encoder for moving the movable support structure along the ball screw; a sprocket coaxially positioned along the saw mandrel; a sprocket sensor operatively adapted to detect a rotating position along the sprocket relative to the sprocket sensor; and a programmable logic controller (PLC) operatively adapted to receive one or more signals (e.g., an analog signal) from the LEMD, and in response to receiving the one or more signals (e.g., the analog signal), sending one or more commands to the bender so as to cause the bender to bend the a given saw blade in the right or left direction depending on the positive or negative tolerance position.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to methods of automatically training saw blades along a saw mandrel. The present invention is further directed to +apparatus for automatically training saw blades along a saw mandrel. An exemplary apparatus of the present invention is depicted in FIG. 1.

Figure 1:
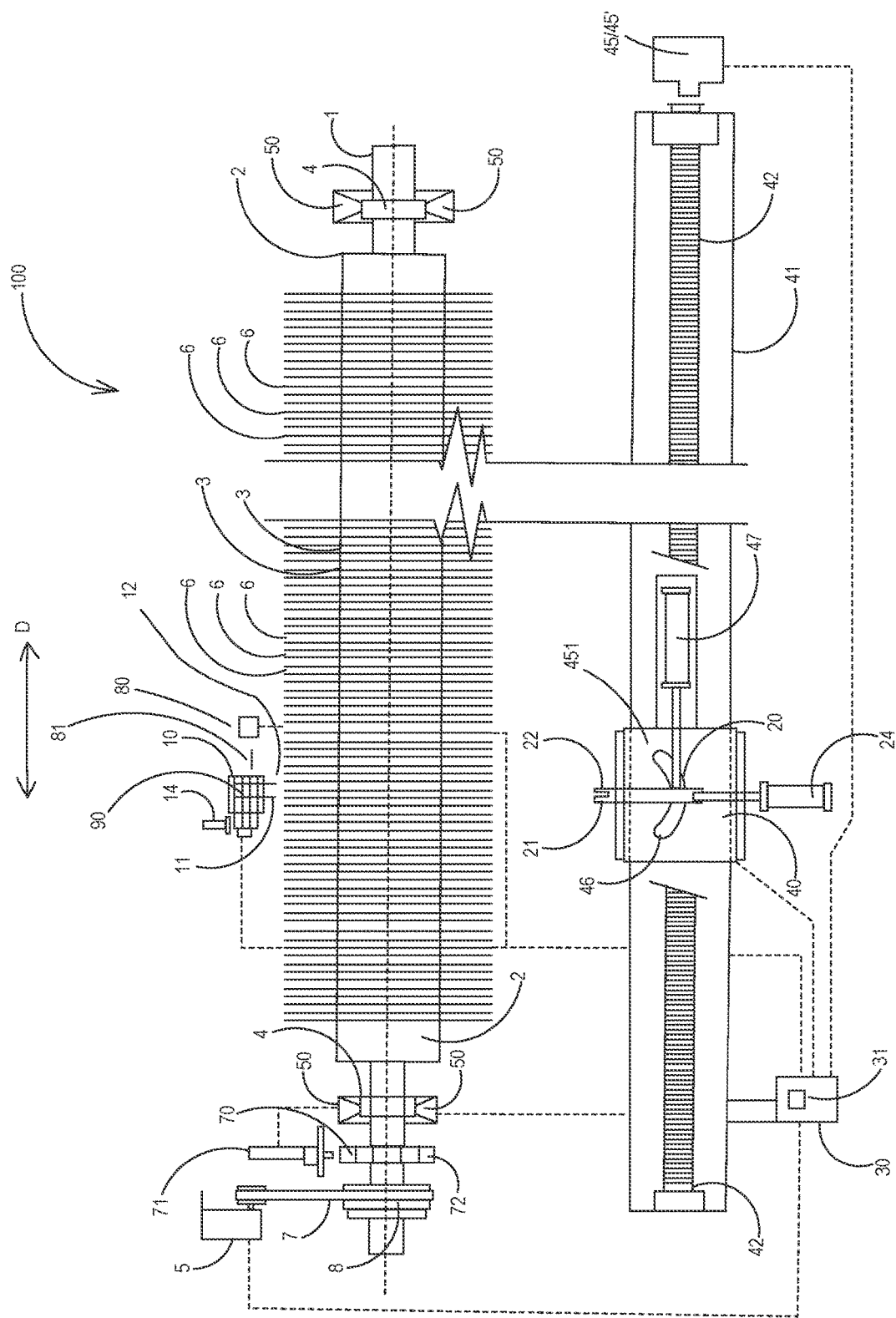
FIG. 1 depicts a top view of an exemplary apparatus of the present invention.

As shown in FIG. 1, exemplary apparatus 100 may comprise a number of components including, but not limited to, a gauge 10 operatively adapted to engage with (i.e., "capture") a given saw blade 6, the gauge 10 comprising (i) a slidable base 90 (see, FIG. 3B) that moves longitudinally relative to and parallel with a saw mandrel 1 (i.e., in direction D as shown in FIG. 1) and (ii) left and right gauge contact members 11/12 extending from the slidable base 90 relative to a first saw blade 6 along the saw mandrel 1 such that the left and right gauge contact members 11/12 of the slidable base 90 extend along and contact opposite left and right major surfaces 661/662 (see, FIG. 3A) of the first saw blade 6, respectively a laser electronic measuring device (LEMD) 80 capable of (i) determining a measured position of the slidable base 90 and (ii) detecting longitudinal movement of the slidable base 90 relative to the saw mandrel (i.e., in direction D as shown in FIG. 1); a bender 20 operatively adapted to bend a given saw blade 6 with an amount of bend force that depends on the amount of out of tolerance of the rotational position of the given saw blade 6 as determined by the laser electronic measuring device (LEMD) 80; and a programmable logic controller (PLC) 30 operatively adapted to (i) receive one or more signals from various apparatus components (e.g., gauge 10, laser electronic measuring device (LEMD) 80, etc.), and (ii) in response to receiving the one or more signals, providing one or more commands to one or more apparatus components (e.g., bender 20) so as to initiate an action by the one or more apparatus components (e.g., bender 20).

Programmable logic controller (PLC) 30 is also operatively adapted to (i) receive inputted data from an operator, (ii) store the inputted data, and (iii) subsequently utilize the inputted data for actions, such as determining an amount of bending force to be used by bender 20. For example, an operator may input a series of increasing bend forces into the PLC 30 that depend on an increased measured amount of out of tolerance as measured by the LEMD 80 (e.g., a bend force of X if the LEMD 80 measures an out of tolerance distance ranging from 0.0001 inch (in) to 0.0003 in, a bend force of 1.5× if the LEMD 80 measures an out of tolerance distance ranging from 0.0004 in to 0.0006 in, a bend force of 2× if the LEMD 80 measures an out of tolerance distance ranging from 0.0007 in to 0.0010 in, etc.).

FIG. 1 also provides a view of an exemplary saw mandrel 1. Exemplary saw mandrel 1 has positioned thereon a plurality of saw blades 6 separated from one another by spacers 3. Large nuts and washers 2 are positioned on opposite sides of the plurality of blades 6 (and spacers 3) so as to lock blades 6 and spacers 3 in position along exemplary saw mandrel 1. As discussed further below, exemplary saw mandrel 1 extends through and rotates within bearings 4, which are connected to and supported by saw mandrel support structure 50. Exemplary saw mandrel motor 5 provides power to rotate exemplary saw mandrel 1 via saw mandrel belt 7 and saw mandrel pulley 8 positioned along and connected to exemplary saw mandrel 1.

Figure 2:
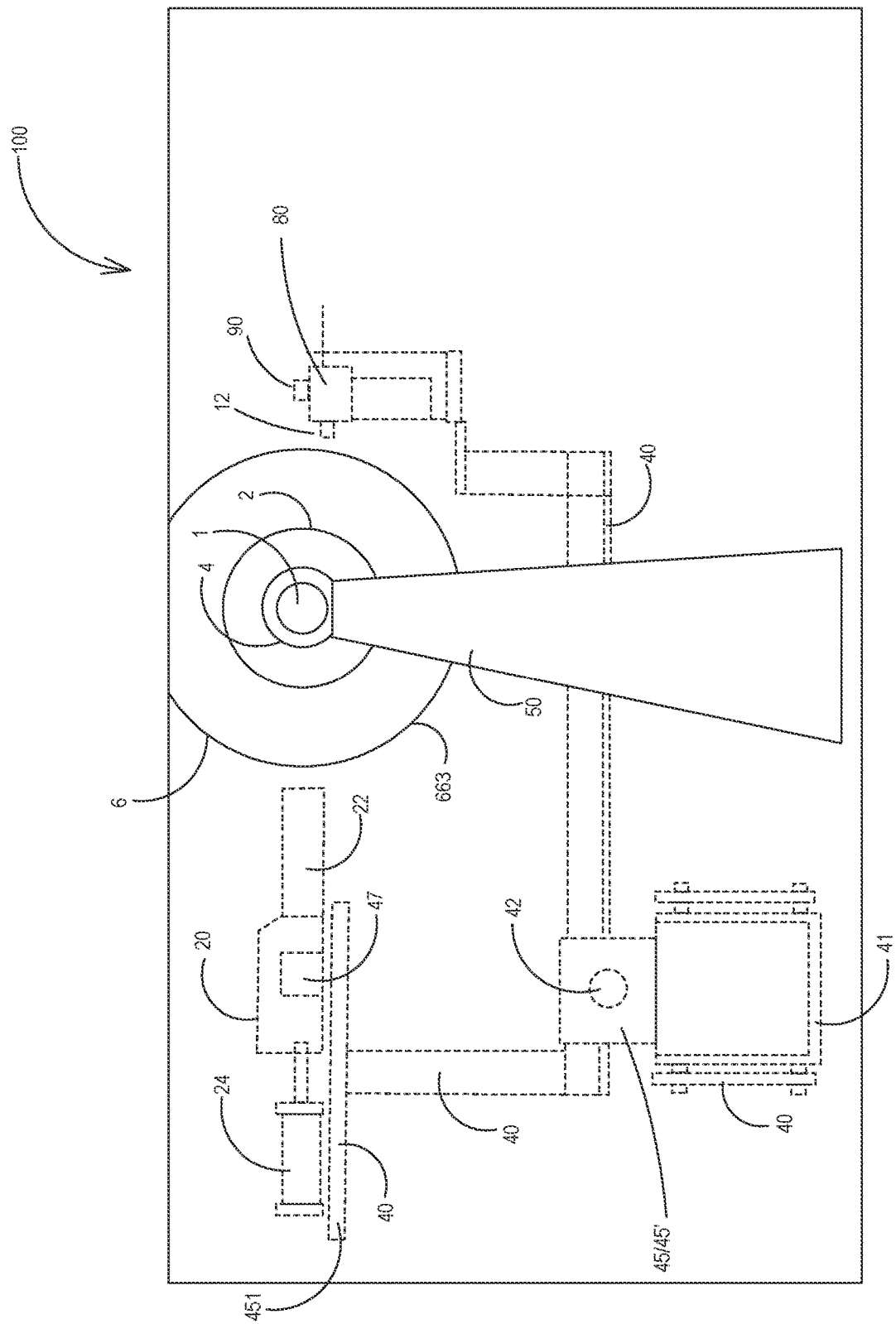
FIG. 2 depicts a side view of the exemplary apparatus shown in FIG. 1 as viewed from a right-hand side of the exemplary apparatus.

FIG. 2 provides a side view of exemplary apparatus 100 shown in FIG. 1 as viewed from a right-hand side of exemplary apparatus 100. As shown in FIG. 2, exemplary apparatus 100 further comprises a movable support member 40 that is movable along a ball screw 42. Movable support member 40 is operatively adapted and sized to (i) support gauge 10, bender 20 and laser electronic measuring device (LEMD) 80, and (ii) move along support member track 41 in response to rotation of ball screw 42 via ball screw sprocket 43, ball screw sprocket belt 44, and ball screw motor 45. It should be noted that although movable support member 40 and support member track 41 are shown as having a particular overall configuration, cross-sectional configuration, ball system, etc., movable support member 40 and support member track 41 may have any overall configuration, cross-sectional configuration, drive system, etc. as long as movable support member 40 is capable of (i) supporting gauge 10, bender 20 and laser electronic measuring device (LEMD) 80, and (ii) moving along support member track 41. In desired embodiments, ball screw motor 45 comprises a servo motor 45' and encoder 91 for moving the movable support structure 40 along the ball screw 42.

Figure 3A:
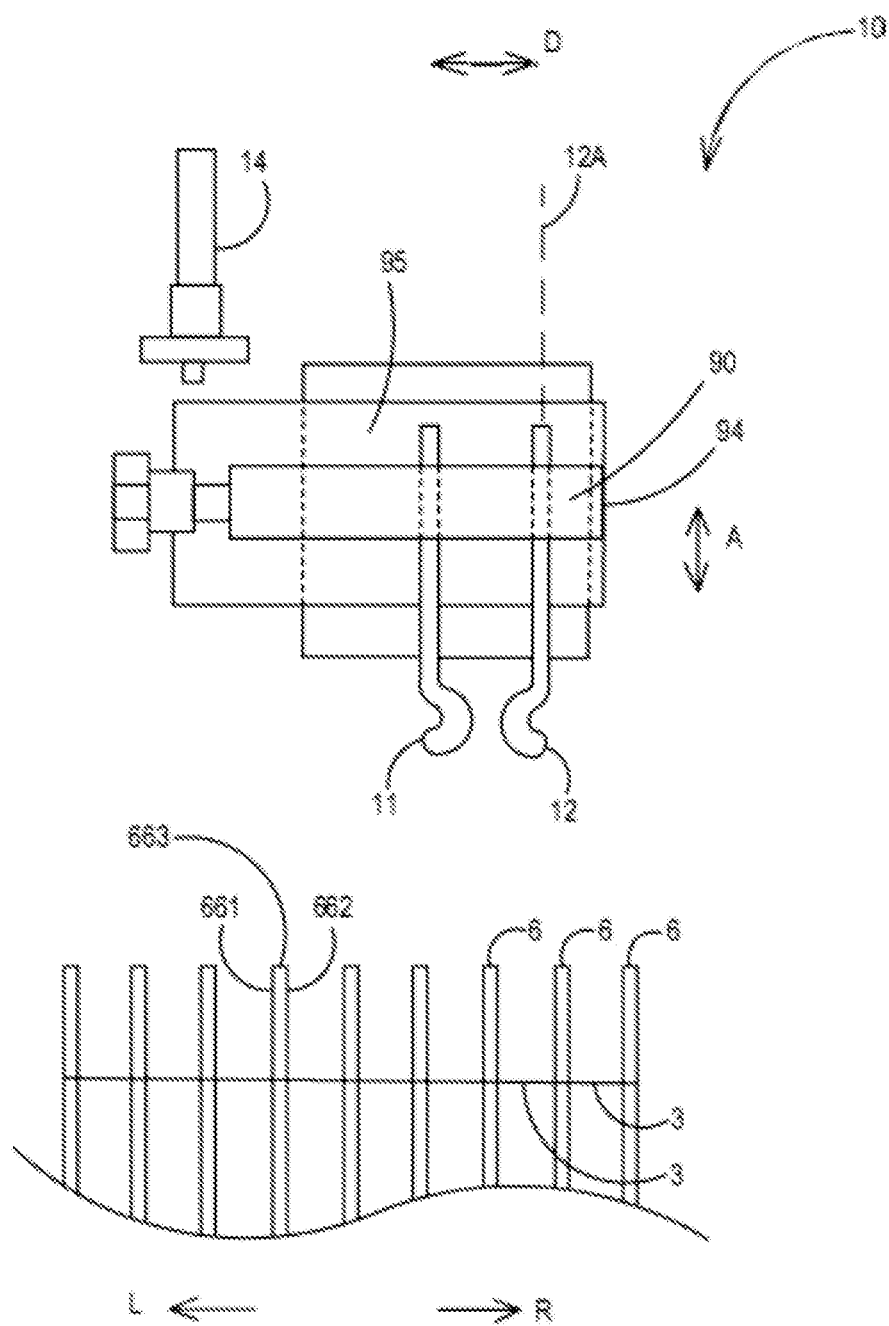
FIG. 3A depicts a top view of an exemplary gauge suitable for use in the exemplary apparatus shown in FIG. 1.

FIG. 3A depicts a top view of exemplary gauge 10 suitable for use in exemplary apparatus 100 shown in FIG. 1. Exemplary gauge 10 comprises slidable base 90 and left and right gauge contact members 11 and 12, respectively, extending from slidable base 90 towards saw blades 6. Left and right gauge contact members 11 and 12 are spaced from one another so as to be positionable along opposite left and right major surfaces 661 and 662, respectively, of a saw blade 6 positioned along saw mandrel 1 such that teeth 663 of saw blade 6 are between the left and right gauge contact members 11 and 12. Exemplary gauge 10 further comprises a gauge positioner 13 (see, FIG. 3B) that is operatively adapted to move exemplary gauge 10 toward and away from a given saw blade 6. Exemplary gauge 10 also comprises a gauge position sensor 14 that is operatively adapted to detect a position of exemplary gauge 10 and optionally provide gauge position data to PLC 30.

In desired embodiments, left and right gauge contact members 11 and 12 each independently comprises carbide members, with one fixed (e.g., the left gauge contact member 11 in a fixed position) and one that rotates on its axis (e.g., the right gauge contact member 12 rotates on its axis 12A) so as to capture (i.e., to be positioned on opposite sides and in contact with major surfaces 661/662) of a given saw blade 6. Materials other than carbide could be used, but carbide provides excellent wear characteristics. The rotating contact member (e.g., the right gauge contact member 12) is desirably spring loaded to allow the capture (i.e., to be positioned on opposite sides and in contact with major surfaces 661/662) of the given saw blade 6 but being of a small enough contact force to allow the saw blade 6 to rotate between left and right gauge contact members 11 and 12.

The left and right gauge contact members 11 and 12 are attached to free sliding base 90 and cause free sliding base 90 to move longitudinally relative to the saw mandrel 2 (i.e., in direction D shown in FIG. 1) when a given saw blade 6 rotates in an out of tolerance manner. For example, a lower portion (not shown) of slidable base 90 may slide within a slot 96 within slidable base support 95 as a given saw blade 6 rotates in an out of tolerance manner.

Laser electronic measuring device (LEMD) 80 emits a laser light beam 81 that strikes a strike location 94 on sliding base 90 so as to determine a measured position of sliding base 90 as a given saw blade 6 rotates, and potentially moves in and out of tolerance. The measurement of the amount of movement in the saw blade 6 as determined by the laser electronic measuring device (LEMD) 80 is provided to PLC 30. When this measurement is out of tolerance (as determined by PLC 30), the PLC 30 causes bender 20 to bend blade 6 (i) in a correction direction (i.e., left or right) (ii) using an amount of bend force that is calculated by the PLC using the LEDM analog signal so as to move saw blade 6 back into tolerance. The bending occurs approximately 180 degrees from the point of contact of left and right gauge contact members 11 and 12 of slidable base 90 of gauge 10.

Figure 3B:
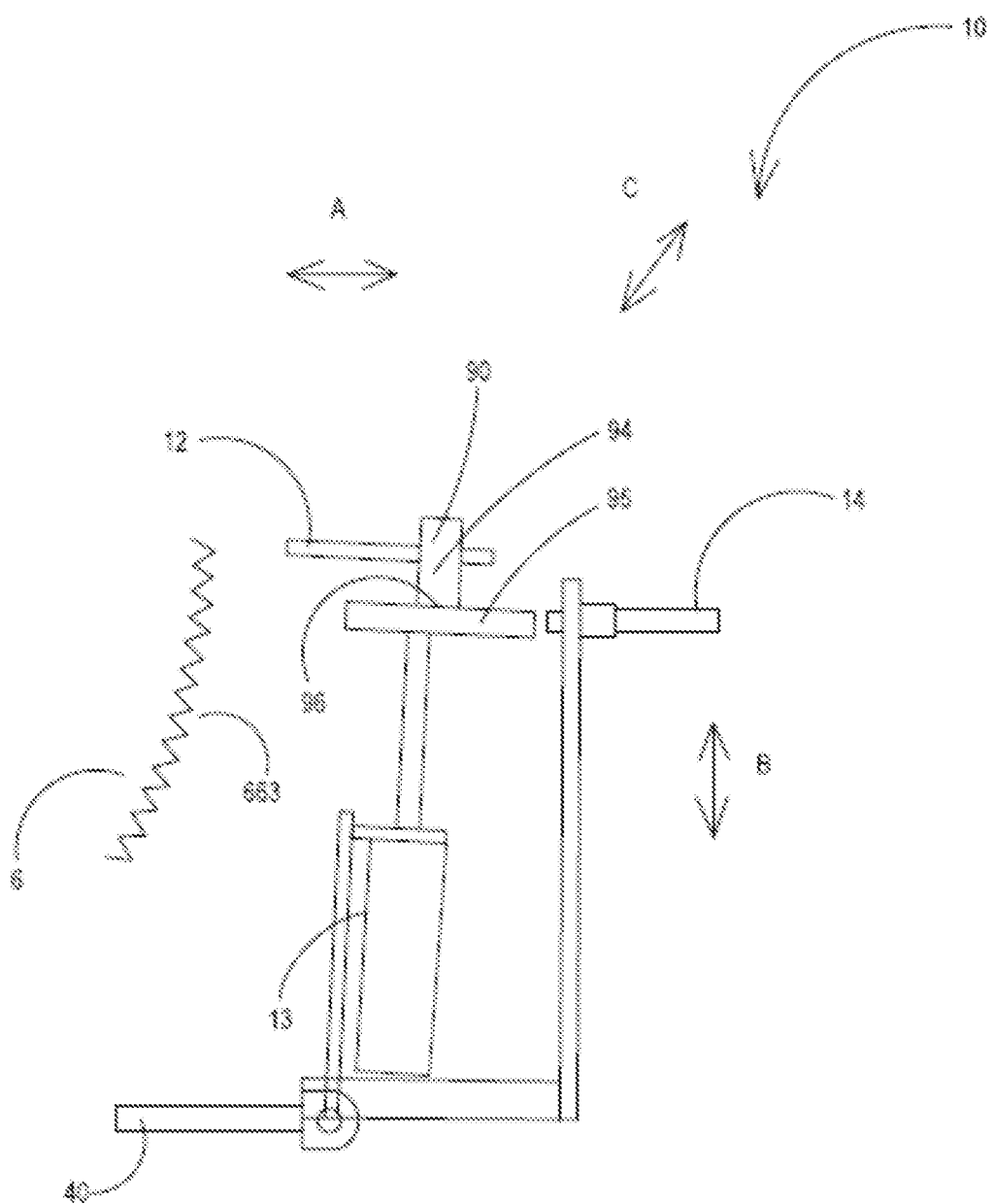
FIG. 3B depicts a side view of the exemplary gauge shown in FIG. 3A as viewed from a right-hand side of the exemplary gauge.
Figure 3C:
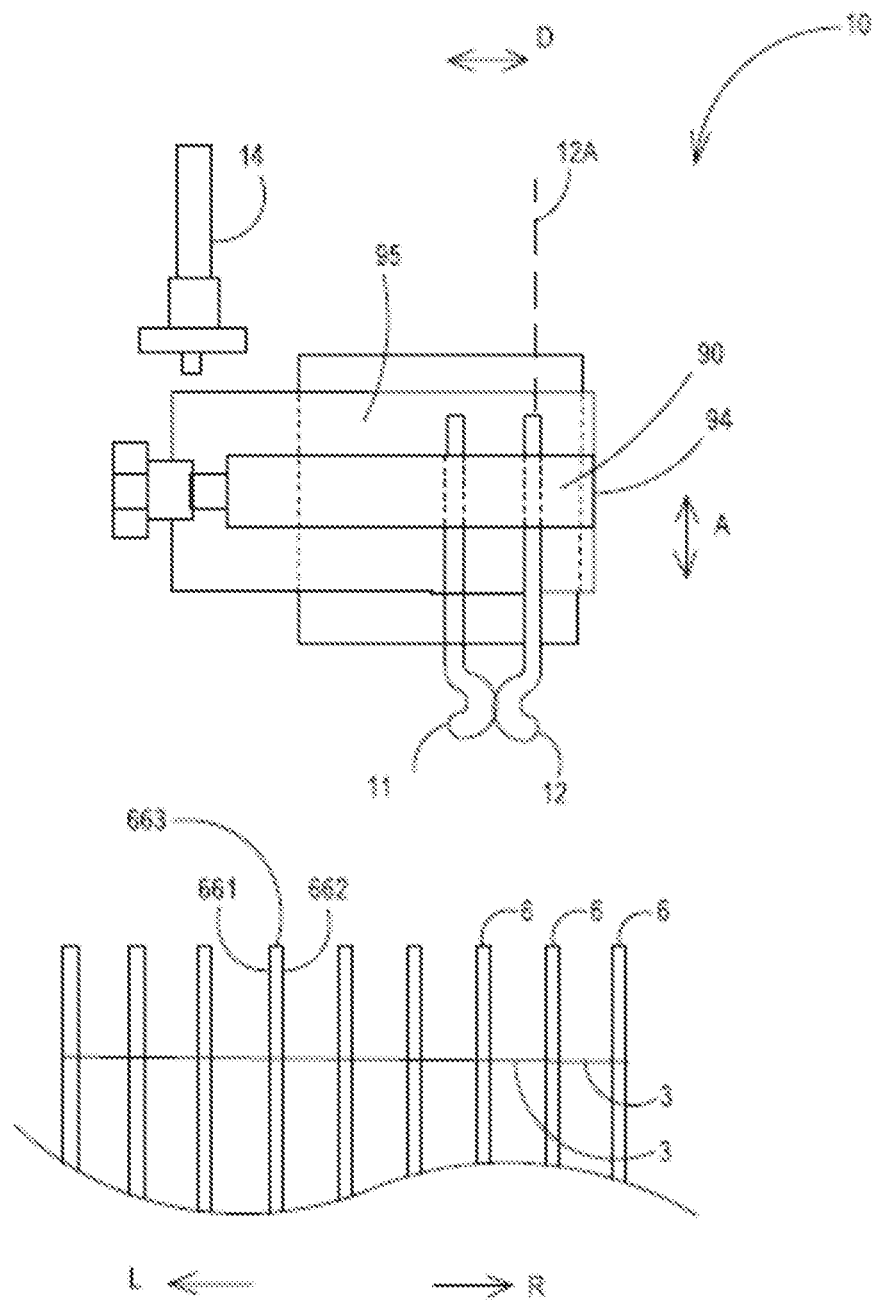
FIG. 3C depicts a top view of the exemplary gauge shown in FIG. 3A with gauge contact members in contact with one another.
Figure 3D:
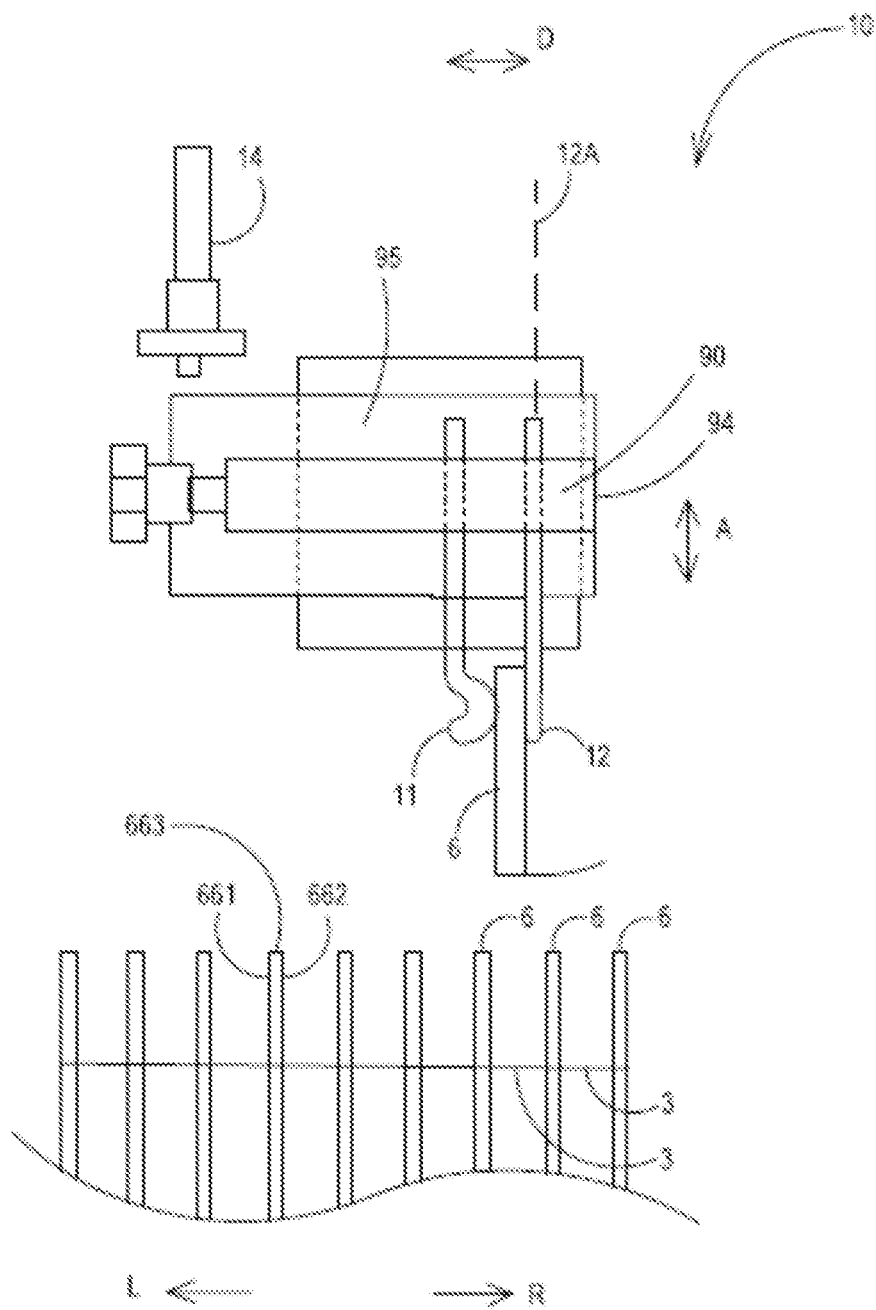
FIG. 3D depicts a top view of the exemplary gauge contact members shown in FIG. 3C along opposite side surfaces of an exemplary saw blade.

FIG. 3B depicts a side view of exemplary gauge 10 shown in FIG. 3A as viewed from a right-hand side of exemplary gauge 10. As shown in FIG. 3B, in some embodiments, gauge positioner 13 may move exemplary gauge 10 toward and away from saw blade 6 in a direction as indicated by arrow A (i.e., in a direction having a horizontal direction component). In other embodiments, gauge positioner 13 may move exemplary gauge 10 toward and away from saw blade 6 in a direction as indicated by arrow B (i.e., in a direction having a vertical direction component). In other embodiments, gauge positioner 13 may move exemplary gauge 10 toward and away from saw blade 6 in a direction as indicated by arrow C (i.e., in a direction having both horizontal and vertical direction components).

Figure 4:
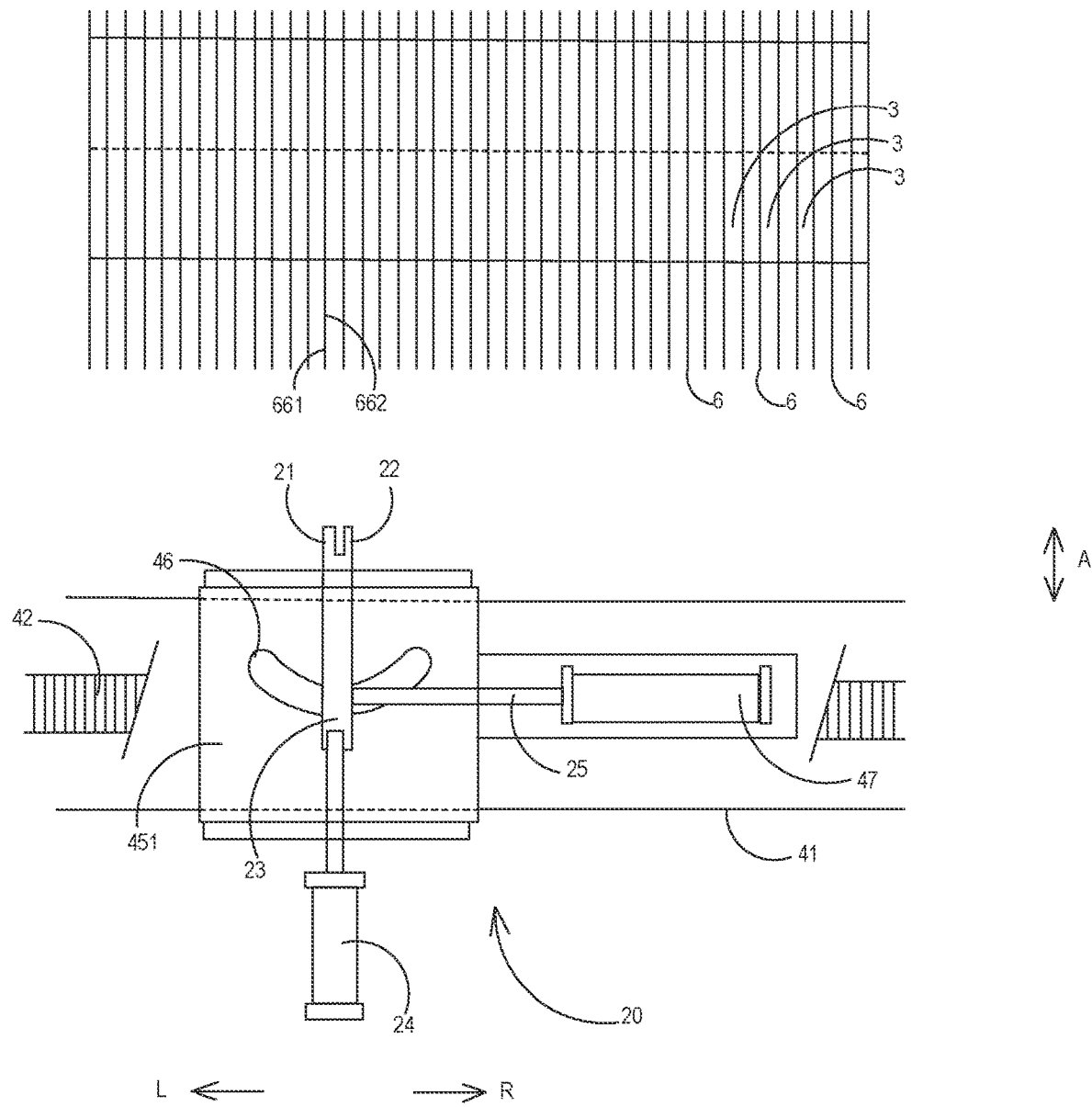
FIG. 4 depicts a top view of an exemplary bender suitable for use in the exemplary apparatus shown in FIG. 1.

In desired embodiments, PLC 30 is operatively adapted to receive one or more signals (e.g., an analog signal from the LEMD), and in response to receiving the one or more signals (e.g., an analog signal from the LEMD), sending a first command to exemplary bender 20 so as to cause exemplary bender 20 to (i) bend first saw blade 6 in the right direction (as shown by arrow R in FIG. 3A) if the first saw blade 6 is in a positive out of tolerance position, or (ii) bend first saw blade 6 in the left direction (as shown by arrow L in FIG. 3A) if the first saw blade 6 is in a negative out of tolerance position FIG. 4 depicts a top view of exemplary bender 20 suitable for use in exemplary apparatus 100 shown in FIG. 1. As shown in FIG. 4, exemplary bender 20 comprises left and right bender contact members 21 and 22, respectively. Left and right bender contact members 21 and 22 are spaced from one another so as to be positionable along the opposite left and right major surfaces 661 and 662 of a given saw blade 6 such that teeth 663 of the given saw blade 6 are between left and right bender contact members 21 and 22. As discussed above, in response to saw blade 6 being out of tolerance (as measured by laser electronic measuring device 80) during rotation of saw mandrel 1, exemplary bender 20 (i) bends saw blade 6 in a right direction (as shown by arrow R in FIG. 4) if first saw blade 6 is in a positive out of tolerance condition, and (ii) bends saw blade 6 in a left direction (as shown by arrow L in FIG. 4) if saw blade 6 is in a negative out of tolerance condition.

As further shown in FIG. 4, exemplary bender 20 also comprises bender member 23 positioned between (i) left and right bender contact members 21 and 22 and (ii) a bender positioner 24 that is operatively adapted to move exemplary bender 20 (i.e., left and right bender contact members 21 and 22 and bender member 23) toward and away from a given saw blade 6. Similar to gauge positioner 13 discussed above, in some embodiments, bender positioner 24 may move exemplary bender 20 toward and away from saw blade 6 in a direction as indicated by arrow A (i.e., in a direction having a horizontal direction component), while in other embodiments, bender positioner 24 may move exemplary bender 20 toward and away from saw blade 6 in a direction having a vertical direction component (as indicated by arrow B in FIG. 5B), and in other embodiments, bender positioner 24 may move exemplary bender 20 toward and away from saw blade 6 in a direction having both horizontal and vertical direction components.

As shown in FIG. 4, exemplary bender 20 further comprises a bender activator 25. Bender activator 25 is operatively adapted to receive a signal from PLC 30, and, in response to receiving the signal from PLC 30, moving (i) bender member 23 and (ii) left and right bender contact members 21 and 22 so as to bend a given saw blade 6. For example, bender activator 25 may exert a first moving force (e.g., a pushing force) onto bender member 23 so as to move bender member 23 in a left direction as shown by arrow L in FIG. 4. Movement of bender member 23 in a left direction causes left and right bender contact members 21 and 22 to bend a given saw blade 6 in a left direction. Bender activator 25 may also exert a second moving force (e.g., a pulling force) onto bender member 23 so as to move bender member 23 in a right direction as shown by arrow R in FIG. 4. Movement of bender member 23 in a right direction causes left and right bender contact members 21 and 22 to bend a given saw blade 6 in a right direction.

It should be understood that bender activator 25 may exert a first moving force (e.g., a pushing force) or a second moving force (e.g., a pulling force), wherein the amount of force for a given moving force differs from a previous or subsequent moving force. In other words, if the LEMD 80 still detects an out of tolerance on a previously corrected position, the bending force will increase by a calculation made in the PLC 30. As discussed herein, the amount of bending force exerted by bender 20 in either direction is determined by the PLC 30 using the LEMD 80 analog signal and preset conditions set by the operator of a contact position along a given saw blade 6

In addition, the force application time of a given moving force may vary from the force application time of a previous or subsequent moving force. In other words, if bending of saw blade 6 is needed over a greater length of saw blade 6, bender activator 25 may exert a first moving force (e.g., a pushing force) or an increased second moving force (e.g., a pulling force) for a greater length of time (e.g., for 0.5 seconds versus 0.1 seconds).

Based on information received from exemplary laser electronic measuring device 80 (e.g., the position of slidable base 90 relative to laser electronic measuring device 80, etc.), PLC 30 provides a signal to bender activator 25 that instructs bender activator 25 to provide a particular amount of a bending force and the duration of the particular bending force.

In one desired embodiment, as shown in FIG. 4, bender member 23 comprises a guide component (not shown) extending into a groove 46 within a guide plate 451. Guide plate 451 may comprise a separate component that is attached to movable support member 40 or may be an integral component of movable support member 40. In either case, groove 46 within guide plate 451 provides a path of movement for bender member 23 when forced in a right of left direction from a neutral position (i.e., a position substantially centered along groove 46 as shown in FIG. 4).

Further, it should be understood that bender activator 25 may comprise a single piston 47 for moving bender member 23 when forced in a right of left direction as shown in FIG. 4. However, in other embodiments, bender activator 25 may comprise more than one piston (or similar device for applying a moving force to bender member 23). For example, in one desired embodiment, two pistons are utilized, wherein one piston applies a pushing force so as to move bender member 23 in a left direction, and another piston applies a pulling force so as to move bender member 23 in a right direction.

Figure 5A:
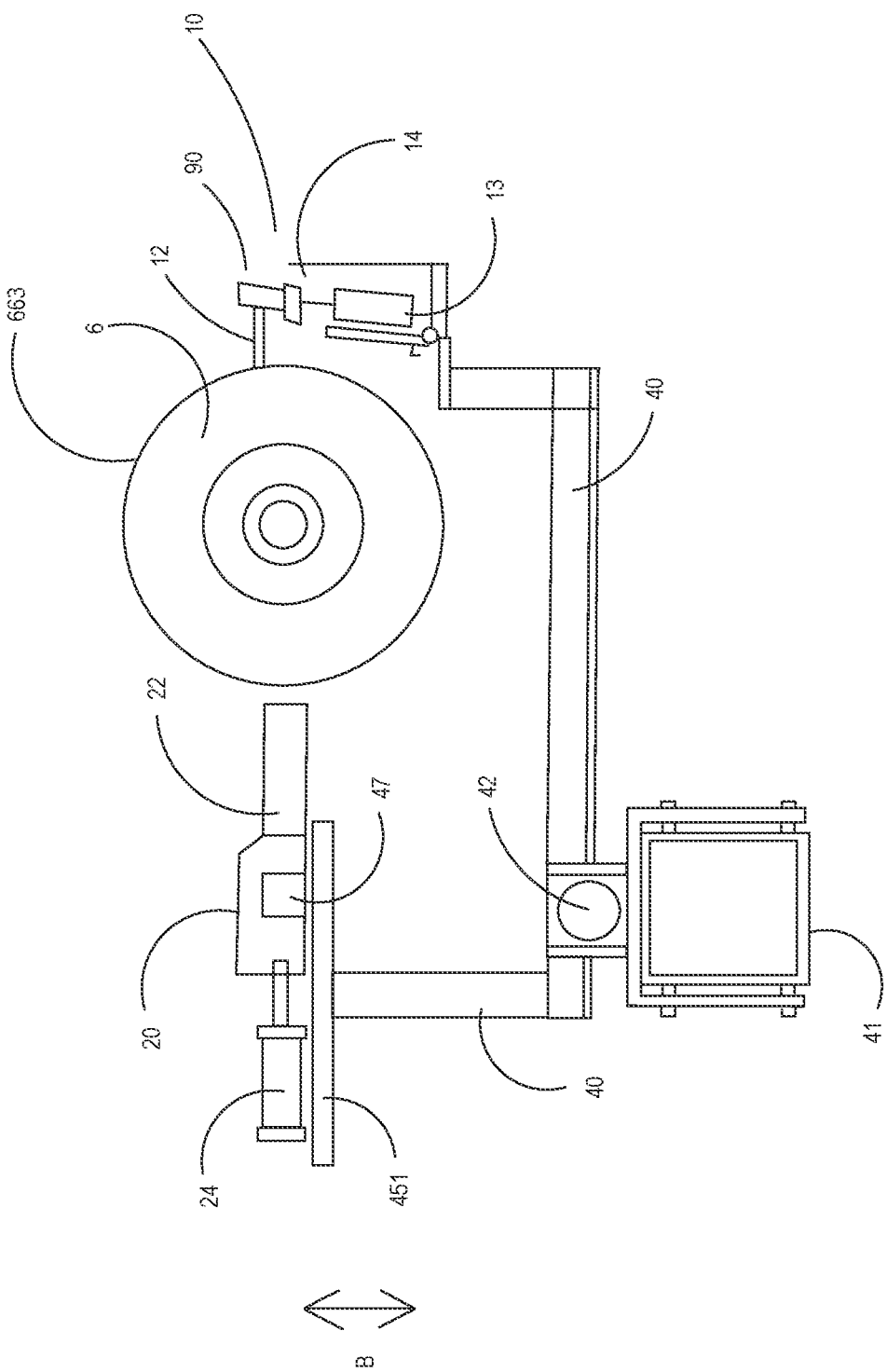
FIG. 5A depicts a side view of the exemplary gauge shown in FIG. 3A and the exemplary bender shown in FIG. 4, both of which are supported by an exemplary movable support member that is movable along a ball screw.

FIG. 5A depicts a side view of exemplary gauge 10 shown in FIG. 3A and exemplary bender 20 shown in FIG. 4, both of which are supported by exemplary movable support member 40 that is movable along ball screw 42 (i.e., shown without exemplary laser electronic measuring device 80 even though exemplary laser electronic measuring device 80 also travels with exemplary gauge 10 and exemplary bender 20 when exemplary movable support member 40 moves along ball screw 42; also shown without servo motor 45, which is attached to an end of ball screw 42 so as to turn ball screw 42). As shown in FIG. 5A, in desired embodiments, exemplary bender 20 is positioned directly opposite exemplary gauge 10 relative to saw mandrel 1 such that any point along a given saw blade 6 (i.e., the point at which left and right gauge contact members 11/12 are in contact with saw blade 6) that is determined to be out of tolerance travels 180° during rotation of saw mandrel 1 so as to be positioned between left and right bender contact members 21 and 22 of exemplary bender 20. As discussed further below, such a 180° separation between exemplary gauge 10 and exemplary bender 20 enables efficient communication and bending action between exemplary gauge 10 and exemplary bender 20 via PLC 30.

Figure 5B:
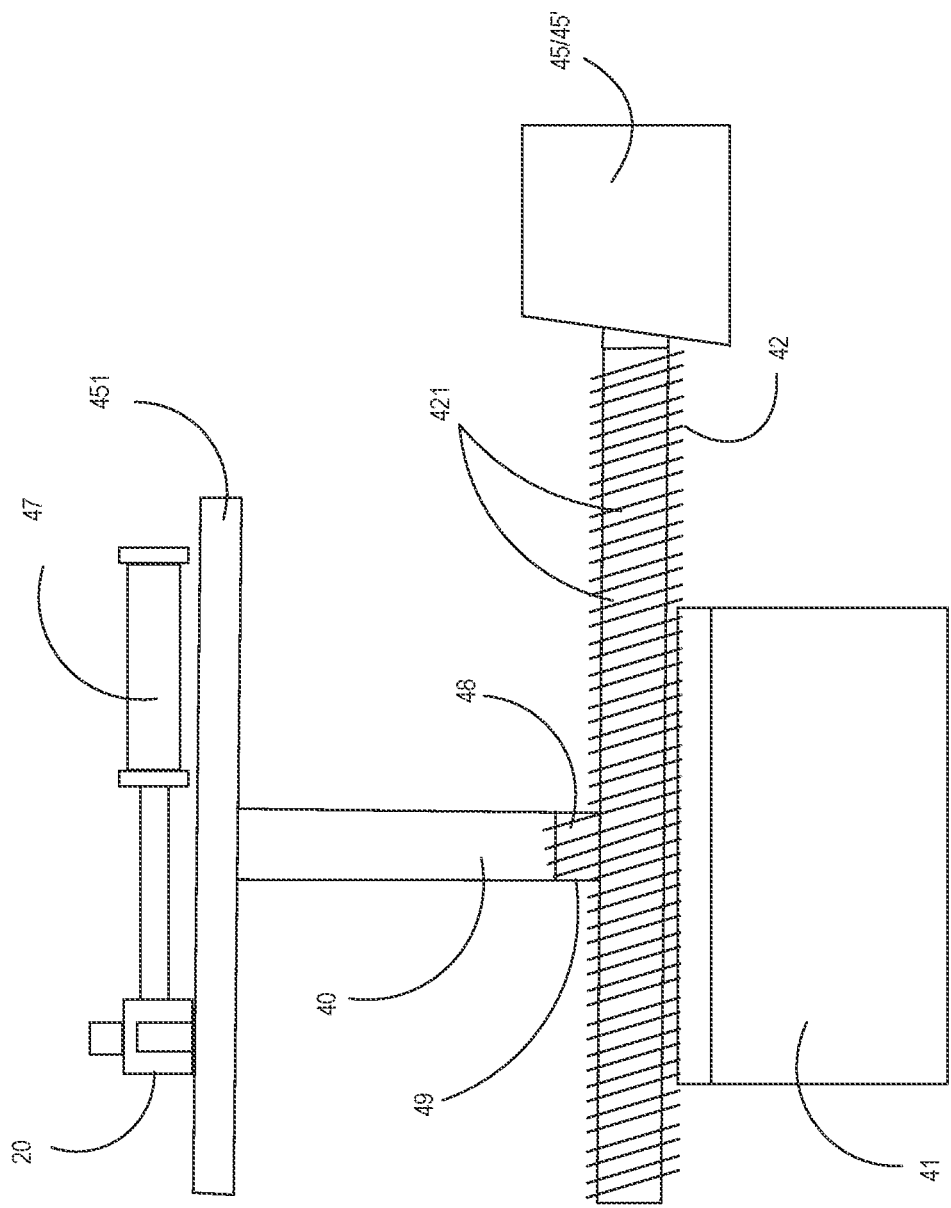
FIG. 5B depicts a rear view of the exemplary movable support member and ball screw shown in FIG. 5A.

FIG. 5B depicts a rear, partially cut-away view of exemplary movable support member 40 and ball screw 42 shown in FIG. 5A with a side view of servo motor 45 attached to an end of ball screw 42 so as to turn ball screw 42. As shown in FIG. 5B, exemplary movable support member 40 comprises a ball screw connection component 48 comprising teeth 49, which fit within grooves 421 of ball screw 42 and enable movement of exemplary movable support member 40 along ball screw 42 in response to rotation of ball screw 42. As servo motor 45 (with embedded encoder) turns exemplary ball screw 42 (e.g., with 5:1 gear box), exemplary movable support member 40 moves along exemplary ball screw 42 in increments as small as, for example, 0.000004 in.

The accuracy of the servo motor system used in the present apparatus is one of the main advantages and improvements over prior saw training apparatus such as the apparatus disclosed in U.S. Pat. No. 8,590,109. In U.S. Pat. No. 8,590,109, a ratio of gears was used to obtain the correct spacing for the saw blade contact gauge and bender assembly from one blade to the next. Since different manufactures use different spacings, different ratio of gears are required for each. Some ratios were exact for certain spacings, while other ratios were close but not exact. These "close" ratios led to an accumulation of error as the gauge/bending assembly moved along the mandrel in the spacing increments.

For example, one manufacturer has a spacing of 0.5741" from blade to blade. The closest available gear ratio is a 54 tooth and a 155 tooth. This ratio gives a movement distance of 0.574074 in from blade to blade (i.e., 155/54×0.2 pitch on the ball screw). This manufacturer has 170 blades on this mandrel, which gives an accumulation error of 0.004394 in for the entire length of the mandrel [(0.5741 in−0.574074 in)×169 positions=0.004394 in]. In contrast, using the servo motor system of the present apparatus, with the 10000 count per revolution encoder on the same mandrel, it would take 1,435250 counts to equal 0.5741". Calculation is as follows: 0.2 in ball screw pitch/5:1 gearbox ratio=0.04 in per revolution of gear box input shaft or servo motor, 0.5741 in/0.04 in revolution=14.3525 revolutions on the servo motor. 10000 counts per revolution×14.3525 revolutions=143525 counts. One count on the servo encoder equals 0.000004" ((0.2/5)/10000) in. of travel of the bender/gauge assembly. The servo can stop or go past the actual number of counts by one count at times, which is a negligible error in the new servo motor system. When the servo system indexes to the next position, it is going to 143525 counts×0.2. Even if it stops short or long, it is going to an absolute number, not from the count for the next position. This cancels any accumulation error and the maximum error would be 0.000004 in. at the end of 169 movements which is for each blade.

The laser electronic measuring device (LEMD) 80 used in the present invention also improves the accuracy and efficiency of the present saw training system 100. In previous apparatus, such as the apparatus disclosed in U.S. Pat. No. 8,590,109, the electrical contact sensors (i.e., used on saw blade contact members) only gave a discreet signal of out of tolerance left or right. With this signal, one could only arbitrarily pick a bend force setting and start trying to fix the saw blade 6, and increasing the bend force until the saw blade 6 was in tolerance. In U.S. Pat. No. 8,590,109, the need for conductivity to determine "out of tolerance" was an issue at times due to rust and development of rust on the saw blades. At times, out of tolerance signals were not being recorded due to poor electrical conductivity. With the laser electronic measuring device (LEMD) 80 system, an analog signal provided by laser electronic measuring device (LEMD) 80 is reading slidable base 90 with contact members 11/12 that have "captured" the saw blade 6. This signal is sent to the PLC 30, which adjusts the bending time and force to match the degree of out of tolerance. The farther out of tolerance, the higher the bend force. Adjustments are also made to the bending force as the progress of the straightening is monitored by the PLC 30 using the LEMD 80. These preliminary settings are adjustable from an operator screen 31.

In addition to the above-described components, exemplary apparatus 100 may further comprise additional components, as shown in FIG. 1, to monitor rotation of saw mandrel 1. As shown in FIG. 1, exemplary apparatus 100 further comprises a sprocket 70 coaxially positioned along saw mandrel 1, and a sprocket sensor 71 operatively adapted to detect a rotating position along sprocket 70 relative to sprocket sensor 71. For example, sprocket 70 may comprise sixteen sprocket teeth 72 equally spaced from one another along an outer perimeter of sprocket 70 (e.g., 360°/16 teeth=22.5° between each tooth 72). Sprocket sensor 71 is operatively adapted to detect (i) a position of a given tooth 72, and (ii) a rotational distance traveled by the given tooth 72 (i.e., in the form of how many teeth 72 have passed by sprocket sensor 71 between an initial time and a subsequent time).

Sprocket 70 and sprocket sensor 71 may be utilized to provide PLC 30 with information that can be used, along with the actual positioning of exemplary gauge 10 and exemplary bender 20, to initiate a bending force (i.e., with a specific amount of bending force based on the measured amount of out of tolerance of saw blade 6 as determined with the LEMD) by exemplary bender 20 onto a specific point along a given saw blade 6. For example, in an embodiment wherein exemplary gauge 10 and exemplary bender 20 are positioned exactly 180° apart from one another, as discussed above, and sprocket 70 comprises 16 equally spaced sprocket teeth 72, once left gauge contact member 11 and right gauge contact member 12 capture saw blade 6 at a point X along a given saw blade 6 (i.e., point X is positioned between and in contact with both left gauge contact member 11 and right gauge contact member 12 of exemplary gauge 10) and laser electronic measuring device 80 measured an out of tolerance position of slidable base 90, PLC 30 receives an out of tolerance signal from laser electronic measuring device 80, and a position of a given sprocket tooth 72 along sprocket 70 from sprocket sensor 71. Sprocket sensor 71 then counts the number of sprocket teeth 72 that pass by sprocket sensor 71, and when sprocket sensor 71 detects the eighth sprocket tooth 72 (i.e., sprocket 70 and saw mandrel 1 have each traveled 180° since the point contact of saw blade 6 with both left gauge contact member 11 and right gauge contact member 12), sprocket sensor 71 provides this information to PLC 30, and PLC 30 sends a signal to exemplary bender 20 to initiate a bending force (i.e., with a specific amount of bending force based on the measured amount of out of tolerance of saw blade 6) at point X along a given saw blade 6.

It should be understood that sprocket 70 may comprise any desired number of sprocket teeth 72. For example, if sprocket 70 comprises 18 equally spaced sprocket teeth 72, each sprocket tooth 72 will be spaced from one another by 20°, and a rotational distance of 9 sprocket teeth 72 will represent a rotation of sprocket 70 and saw mandrel 1 of 180°. In another example, if sprocket 70 comprises 36 equally spaced sprocket teeth 72, each sprocket tooth 72 will be spaced from one another by 10°, and a rotational distance of 18 sprocket teeth 72 will represent a rotation of sprocket 70 and saw mandrel 1 of 180°.

As further noted above, if exemplary gauge 10 and exemplary bender 20 are positioned apart from one another at an angle other than 180°, for example, 90° from one another, and sprocket 70 comprises 16 equally spaced sprocket teeth 72, once left gauge contact member 11 and right gauge contact member 12 capture saw blade 6 at a point X along a given saw blade 6 (i.e., point X is positioned between and in contact with both left gauge contact member 11 and right gauge contact member 12 of exemplary gauge 10) and laser electronic measuring device 80 measured an out of tolerance position of slidable base 90, PLC 30 receives an out of tolerance analog signal from laser electronic measuring device 80, and a position of a given sprocket tooth 72 along sprocket 70 from sprocket sensor 71. Sprocket sensor 71 then counts the number of sprocket teeth 72 that pass by sprocket sensor 71, and when sprocket sensor 71 detects the fourth sprocket tooth 72 (i.e., sprocket 70 and saw mandrel 1 have each traveled 90° since the point contact of saw blade 6 with left gauge contact member 11 and right gauge contact member 12), sprocket sensor 71 provides this information to PLC 30, and PLC 30 sends a signal to exemplary bender 20 to initiate a bending force (i.e., with a specific amount of bending force based on the measured amount of out of tolerance of saw blade 6 as measured by the LEDM) at point X along a given saw blade 6.

The present invention is further directed to methods of automatically training saw blades along a saw mandrel to improve accuracy and efficiency using the herein-described apparatus 100. The disclosed methods of automatically training saw blades along a saw mandrel may utilize one or more apparatus components as shown in FIGS. 1-5B and as discussed above.

The disclosed methods of automatically training saw blades along a saw mandrel may comprise one or more steps so as to enable the disclosed automatic saw trainer to go to a correct starting position, rotate the saw mandrel (e.g., saw mandrel 1), check the entire 360° of a given saw blade (e.g., saw blade 6) with a sensor (e.g., gauge 10), and automatically correct any places on the blade that are out of tolerance (e.g., via bender 20). The procedure is repeated until each saw blade along a given saw mandrel has been checked and corrected.

In one exemplary embodiment, the present invention is directed to a method of automatically training saw blades along a saw mandrel, wherein the method comprises positioning a gauge 10 comprising (i) a slidable base 90 that moves longitudinally relative to and parallel with the saw mandrel 1 and (ii) left and right gauge contact members 11/12 extending from the slidable base 90 relative to a first saw blade 6 along the saw mandrel 1 such that the left and right gauge contact members 11/12 of the slidable base 90 extend along and contact opposite left and right major surfaces 661/662 of the first saw blade 6, respectively; and in response to the first saw blade 6 being out of tolerance based on a measured position and longitudinal movement of the slidable base 90 relative to the saw mandrel 1 during rotation of the saw mandrel 1, bending the first saw blade 6 in a right direction if the first saw blade 6 is in a positive out of tolerance position, and (ii) bending the first saw blade 6 in a left direction if the first saw blade 6 is in a negative out of tolerance position, with the bending being facilitated by the above-described bender 20.

The disclosed methods of automatically training saw blades along a saw mandrel may further comprise one or more additional steps including, but not limited to:

positioning a bender (e.g., bender 20) relative to the first saw blade (e.g., saw blade 6) such that left and right bender contact members (e.g., left and right bender contact members 21 and 22) of the bender extend along the opposite left and right major surfaces (e.g., left and right major surfaces 661 and 662) of the first saw blade 6, and teeth (e.g., teeth 663) of the first saw blade 6 are between the left and right bender contact members 21/23; and rotating the saw mandrel (e.g., saw mandrel 1), for example, via a saw mandrel motor (e.g., saw mandrel motor 5);

in response to the first saw blade (e.g., saw blade 6) not being out of tolerance as determined by laser electronic measuring device 80 during at least one complete rotation of the saw mandrel (e.g., saw mandrel 1), moving the gauge (e.g., gauge 10) and the bender (e.g., bender 20) away from the first saw blade (e.g., saw blade 6) such that the left and right gauge contact members (e.g., left and right gauge contact members 11 and 12) of the gauge (e.g., gauge 10) and the left and right bender contact members (e.g., left and right bender contact members 21 and 22) of the bender (e.g., bender 20) do not extend along the opposite left and right major surfaces (e.g., left and right major surfaces 661 and 662) of the first saw blade, and subsequently, moving the gauge (e.g., gauge 10) and the bender (e.g., bender 20) along the saw mandrel (e.g., saw mandrel 1) a distance equal to a correct spacing between adjacent saw blades (e.g., adjacent saw blades 6);

moving the gauge (e.g., gauge 10) and the bender (e.g., bender 20) toward a second saw blade (e.g., another, adjacent saw blade 6) of the saw mandrel (e.g., saw mandrel 1) such that (i) the left and right gauge contact members of slidable base 90 (e.g., left and right gauge contact members 11 and 12) of the gauge (e.g., gauge 10) "capture" (i.e., extend along and make contact with opposite left and right major surfaces 661 and 662 of saw blade 6) and (ii) the left and right bender contact members (e.g., left and right bender contact members 21 and 22) of the bender (e.g., bender 20) extend along opposite left and right major surfaces (e.g., left and right major surfaces 661 and 662) of the second saw blade; and in response to the second saw blade (e.g., saw blade 6) being out of tolerance as determined by laser electronic measuring device 80 during rotation of the saw mandrel (e.g., saw mandrel 1), bending the second saw blade (e.g., saw blade 6) (i.e., via bender 20) (a)(i) in a right direction if the first saw blade 6 is in a positive out of tolerance position, and (ii) in a left direction if the first saw blade 6 is in a negative out of tolerance position, (b) using an amount of bend force that is calculated by the PLC 30 using the LEMD 80 analog value along with operator setup parameters.

As discussed above, in some desired embodiments, the methods of the present invention comprise positioning the gauge (e.g., gauge 10) and bender (e.g., bender 20) in strategic positions relative to one another, and relative to a saw mandrel (e.g., saw mandrel 1) being trained. In one desired method, the bender (e.g., bender 20) is positioned directly opposite the gauge (e.g., gauge 10) relative to the saw mandrel (e.g., saw mandrel 1) such that any point along the first saw blade (e.g., saw blade 6) that is found to be out of tolerance by the LEMD 80 travels 180° during rotation of the saw mandrel so as to be positioned between the left and right bender contact members (e.g., left and right bender contact members 21 and 22) of the bender (e.g., bender 20) for bending.

The present invention is also directed to methods of automatically training saw blades (e.g., saw blades 6) along a saw mandrel (e.g., saw mandrel 1), wherein the method comprises: rotating a saw mandrel (e.g., saw mandrel 1) comprising multiple saw blades (e.g., saw blades 6) spaced from one another along the saw mandrel; and in response to a first saw blade not being out of tolerance during at least one complete rotation of the saw mandrel and while the gauge (e.g., gauge 10) is in an activated position (e.g., when teeth 663 or just beyond the teeth 663 of a given saw blade are positioned between left and right gauge contact members 11 and 12 of gauge 10), moving the gauge (e.g., gauge 10) into a deactivated position (e.g., as shown in FIG. 1) via a programmable logic controller (e.g., PLC 30); and subsequently moving the gauge (e.g., gauge 10) and a bender (e.g., bender 20) along the saw mandrel (e.g., saw mandrel 1) a distance equal to a spacing between adjacent saw blades (e.g., adjacent saw blades 6) via the programmable logic controller (e.g., PLC 30) and the servo motor 45 with encoder.

Figure 6A:
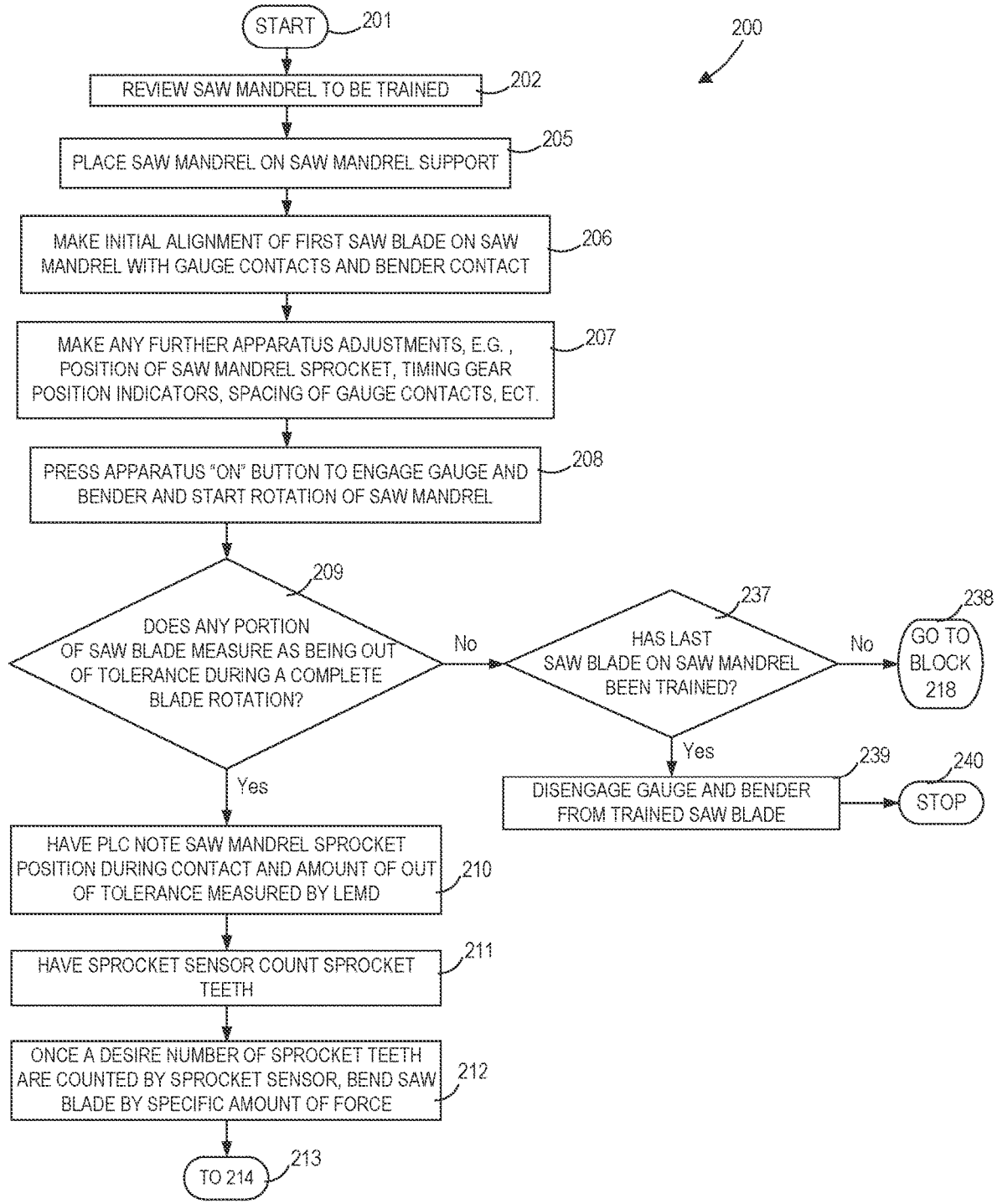
FIGS. 6A-6C depict a flowchart detailing exemplary steps suitable for use in the disclosed methods of automatically training saw blades along a saw mandrel.
Figure 6B:
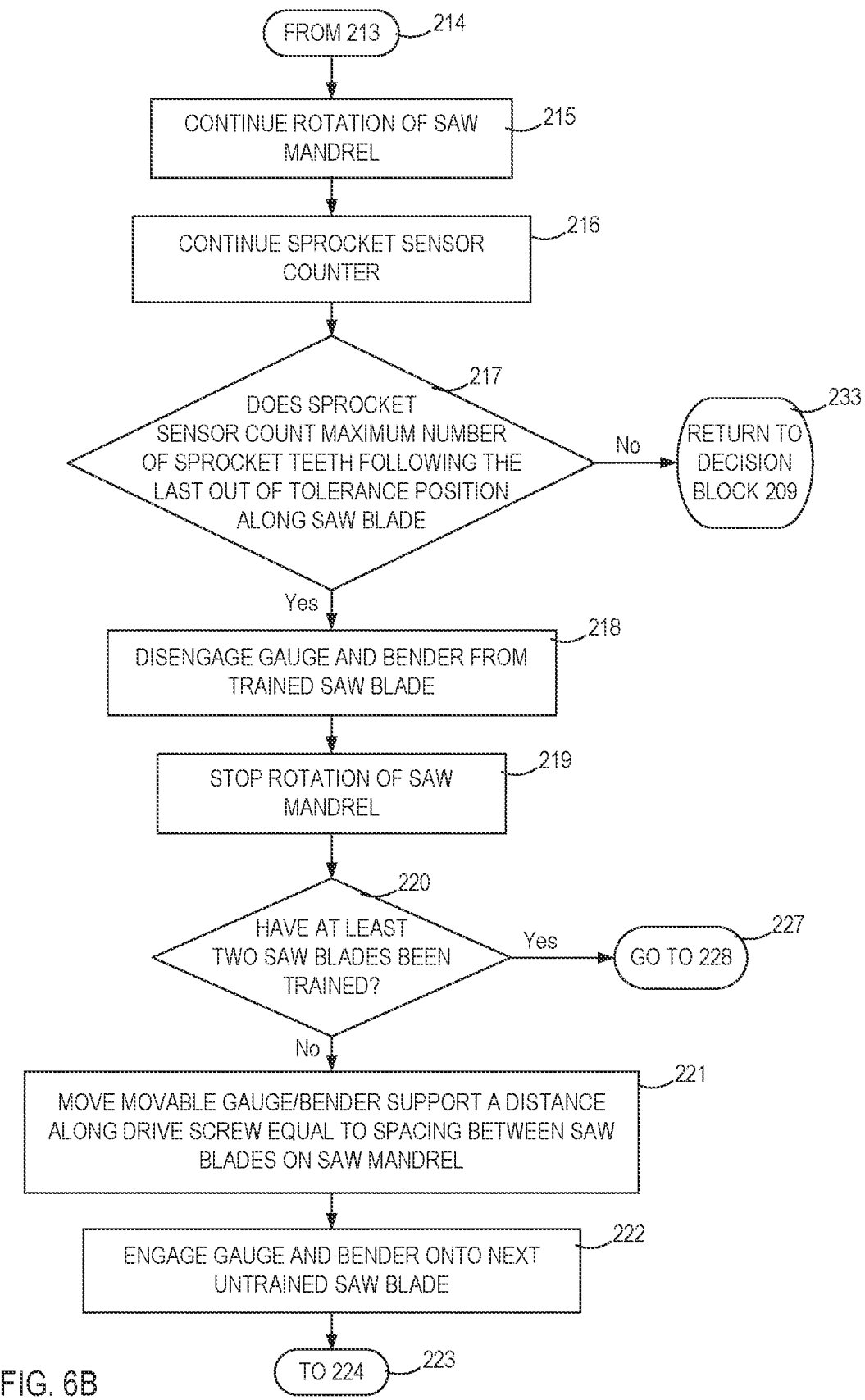
Figure 6C:
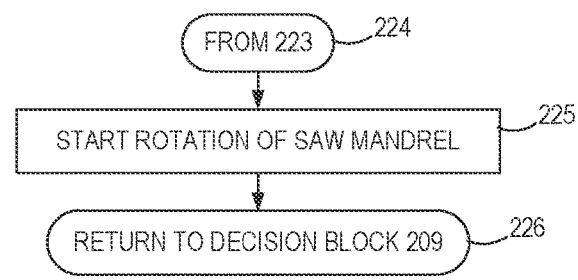
Figure 6C:
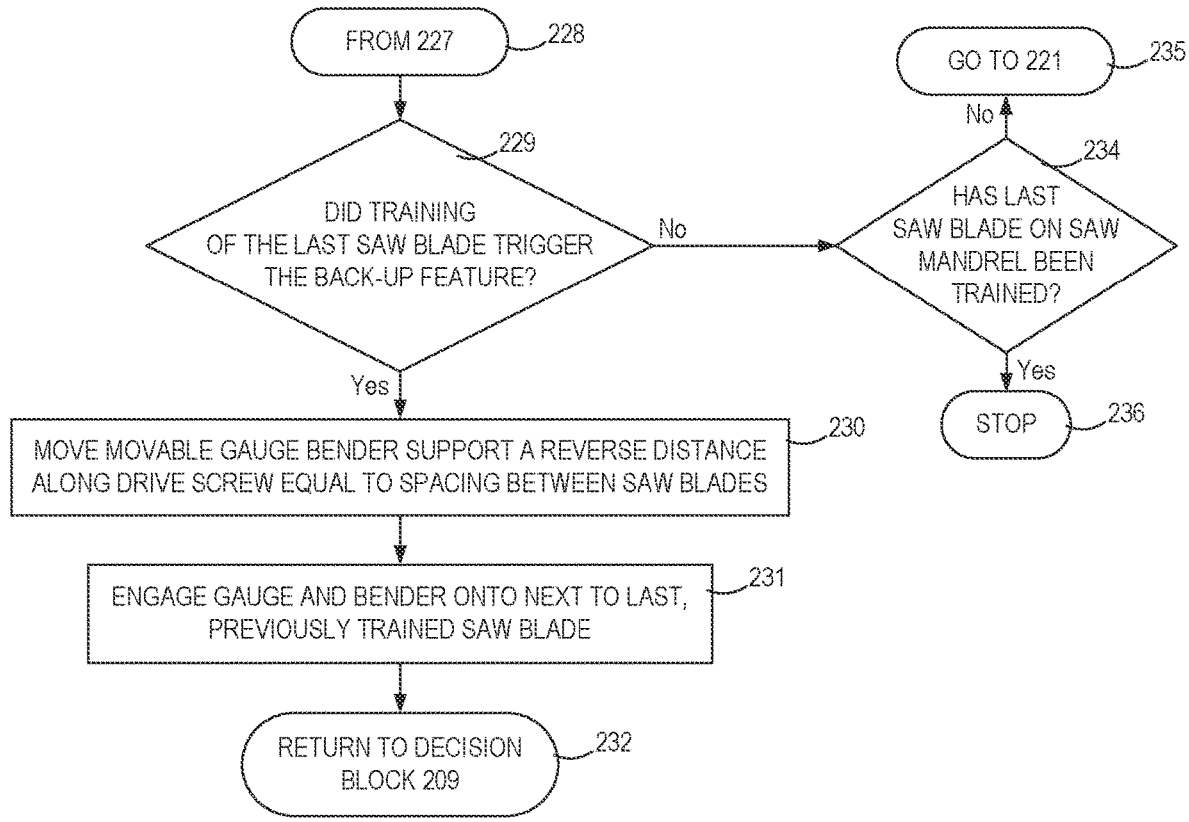

FIGS. 6A-6C depict a flowchart detailing exemplary steps suitable for use in the disclosed methods of automatically training saw blades along a saw mandrel. It should be noted that methods of automatically training saw blades along a saw mandrel of the present invention may include one or more of the exemplary method steps shown in FIGS. 6A-6C, and that the combination of steps shown in FIGS. 6A-6C represents one example of a suitable combination of steps in the disclosed methods of the present invention.

As shown in FIG. 6A, exemplary method 200 starts at start block 201 and proceeds to step 202, wherein the saw mandrel (e.g., saw mandrel 1) to be trained is reviewed. In this step, various parameters defining the saw mandrel may be determined and inputted into a programmable logic controller such as PLC 30 (e.g., the model and/or manufacturer of the saw mandrel 1) Saw mandrel parameters may include, but are not limited to, the model and/or manufacturer of the saw mandrel, the overall length of the saw mandrel, the total number of saw blades (e.g., saw blades 6) on the saw mandrel, the spacing between adjacent saw blades, the overall diameter of each saw blade, the overall diameter of spacers (e.g., spacers 3) positioned between adjacent saw blades, etc.

From step 202, exemplary method 200 proceeds to step 205, wherein the saw mandrel is positioned onto the saw mandrel support (e.g., saw mandrel support 50) of the apparatus (e.g., apparatus 100).

From step 205, exemplary method 200 proceeds to step 206, wherein the bender/gauge assembly/support 40 is manually positioned along the ball screw (e.g., ball screw 42) by a toggle switch (not shown), which continuously runs the servo motor 45 to a center saw blade 6 or a saw blade 6 adjacent the center saw blade 6. At this point, the gauge 10 and bender 20 are manually activated to the training/bending position. From the operator's screen 31, a "capture center" button is depressed, and the LEMD 80 is set to "0" at this point. All saw blades 6 down the mandrel 1 are now analyzed from this one "zero captured point." The gauge/bender assembly/support 40 is now manually deactivated. At this time, the gauge/bender assembly/support 40 travels to the first blade 6 to begin the training process of the mandrel 41. This initial alignment step may further comprise one or more of the following step components: manually aligning the movable gauge/slidable base/bender support (e.g., movable gauge 10/slidable base 90/bender support 40) with the first untrained saw blade; engaging the gauge and bender so as to be positioned in the above-described activated position; manually rotating the saw mandrel while simultaneously making fine adjustments in the position of the movable gauge/slidable base/bender support (e.g., movable gauge 10/slidable base 90/bender support 40) so as to position the first untrained saw blade in a central location between contact members of the gauge; inputting a "zeroed" slidable base 90 position (i.e., a position of the slidable base 90 observed by an operator as being a position at which the saw blade is in tolerance) into the PLC 30; and, following any fine-tune position adjustments, disengaging the gauge and bender so as to be positioned in the above-described deactivated position.

From step 206, exemplary method 200 proceeds to step 207, wherein any further apparatus adjustments are made. For example, in this step, the following adjustments may be made: adjusting a position of the saw mandrel sprocket (e.g., sprocket 70) so as to align a given tooth (e.g., sprocket tooth 72) of the saw mandrel sprocket (e.g., sprocket 70) with the sprocket sensor (e.g., sprocket sensor 71); and adjusting a position of and/or an amount of spring-loaded force applied to gauge contact members (e.g., the position of surface 111 of left gauge contact member 11 and surface 112 of right gauge contact member 12 shown in FIG. 3A) relative to one another.

From step 207, exemplary method 200 proceeds to step 208, wherein the apparatus "on" button is pushed. In this step, the gauge (e.g., gauge 10) and bender (e.g., bender 20) are moved from a deactivated position (i.e., positioned away from a given saw blade 6) to an activated position (i.e., positioned adjacent to, and in the case of gauge contact members 11 and 12, in contact with a given saw blade 6 so as to measure tolerance based on a measured position of the slidable base 90), and rotation of the saw mandrel is initiated. It should be understood that this step may involve pushing multiple "on" buttons so as to initiate one or more of (1) activation of the gauge (e.g., gauge 10), (2) activation of the bender (e.g., bender 20), and (3) initiation of rotation of the saw mandrel.

From step 208, exemplary method 200 proceeds to decision block 209, wherein a determination is made whether any portion of the saw blade is measured as being out of tolerance during a complete rotation of the saw blade 6. If a determination is made that any portion of the saw blade is measured as being out of tolerance during a complete rotation of the saw blade 6, exemplary method 200 proceeds from decision block 209 to step 210, wherein the programmable logic controller (e.g., PLC 30) notes (i) the contact position along the saw blade (i.e., the point along the saw blade that is in contact with the left and right contact members of the gauge) via the saw mandrel sprocket position (e.g., the position of a specific tooth 72 on sprocket 70), and (ii) the amount of out of tolerance as measured by the laser electronic measuring device (LEMD) 80.

From step 210, exemplary method 200 proceeds to step 211, wherein the saw mandrel sprocket sensor (e.g., sprocket sensor 71) counts sprocket teeth following an out of tolerance reading so as to monitor the number of sprocket teeth that pass saw mandrel sprocket sensor after the saw blade out of tolerance reading (e.g., sprocket sensor 71 monitors the position of the specific tooth 72 on sprocket 70 that corresponds to the location along the saw blade that measured an out of tolerance reading).

From step 211, exemplary method 200 proceeds to step 212, wherein once a desired number of sprocket teeth are counted by the saw mandrel sprocket sensor (e.g., sprocket sensor 71), the programmable logic controller (e.g., PLC 30) instructs the bender (e.g., bender) to bend the saw blade (e.g., at the location along the saw blade that measured an out of tolerance reading) by a specific amount of bend force proportional to the amount of out of tolerance of the location on the saw blade 6. The specific amount of bending and direction of bending will be determined by the PLC 30 based on a number of factors including, but not limited to, the out of tolerance distance as measured by the laser electronic measuring device (LEMD) 80, prior bending movements stored in the memory of the programmable logic controller (e.g., PLC 30), the model/manufacture of the saw mandrel 1, etc.

From step 212, exemplary method 200 proceeds to block 213, wherein exemplary method 200 proceeds to block 214 shown in FIG. 6B. From block 214, exemplary method 200 proceeds to step 215, wherein rotation of the saw mandrel is continued following a momentary stoppage (e.g., typically, for a fraction of a second) for the bending step. It should be noted that typically, the bending force utilized to bend a given saw blade exceeds a rotational force on the saw blade 6, resulting in a temporary stoppage of the saw blade 6 during bending. In other embodiments, the programmable logic controller (e.g., PLC 30) may instruct a given apparatus 100 to stop rotation of the saw mandrel 1 prior to any bending step.

From step 215, exemplary method 200 proceeds to block 216, wherein the sprocket sensor (e.g., sprocket sensor 71) continues to count sprocket teeth (e.g., sprocket teeth 72) as the sprocket teeth move past the sprocket sensor. The total count of sprocket teeth (e.g., sprocket teeth 72) that pass by the sprocket sensor (e.g., sprocket sensor 71) is provided to the programmable logic controller (e.g., PLC 30) and utilized as discussed below.

From step 216, exemplary method 200 proceeds to decision block 217, wherein a determination is made whether the sprocket sensor (e.g., sprocket sensor 71) has counted a maximum number of sprocket teeth (e.g., the total number of sprocket teeth 72 on a given sprocket 70) following the last out of tolerance position on the saw blade. If a determination is made that the sprocket sensor (e.g., sprocket sensor 71) has counted a maximum number of sprocket teeth (e.g., the total number of sprocket teeth 72 on a given sprocket 70) following the last out of tolerance position, exemplary method 200 proceeds from decision block 217 to step 218, wherein the programmable logic controller (e.g., PLC 30) instructs the gauge (e.g., gauge 10) and the bender (e.g., bender 20) to disengage from the trained saw blade (i.e., return to the deactivated position).

From step 218, exemplary method 200 proceeds to step 219, wherein the programmable logic controller (e.g., PLC 30) instructs the saw mandrel motor (e.g., saw mandrel motor 5) to stop, causing rotation of the saw mandrel (e.g., saw mandrel 1) to stop.

From step 219, exemplary method 200 proceeds to decision block 220, wherein a determination is made whether at least two saw blades 6 have been trained. If a determination is made that at least two saw blades 6 have been trained, exemplary method 200 proceeds from decision block 220 to step 221, wherein the programmable logic controller (e.g., PLC 30) instructs servo motor with embedded encoder 45 to start rotation of the ball screw 42, causing movable gauge/bender support member (e.g., movable support member 40) to move along the ball screw (e.g., ball screw 42). As discussed above, in this step, movable gauge/bender support member (e.g., movable support member 40) moves along the ball screw (e.g., ball screw 42) a distance equal to the spacing between adjacent saw blades as determined by the PLC 30 following model/manufacture data inputted by an operator).

From step 221, exemplary method 200 proceeds to step 222, wherein the programmable logic controller (e.g., PLC 30) instructs the gauge (e.g., gauge 10) and the bender (e.g., bender 20) to move from a deactivated position into an activated position so as to engage with the next saw blade 6 to be trained. From step 222, exemplary method 200 proceeds to step 223, wherein exemplary method 200 proceeds to step 224 shown in FIG. 6C.

From step 224, exemplary method 200 proceeds to step 225, wherein programmable logic controller (e.g., PLC 30) instructs motor 5 to begin rotation of saw mandrel. From step 225, exemplary method 200 proceeds to step 225, wherein exemplary method 200 returns to decision block 209 and proceeds as described herein.

Returning to decision block 209 (shown in FIG. 6A), if a determination is made that any portion of the saw blade does not measure as being out of tolerance during a complete rotation of the saw blade 6, exemplary method 200 proceeds from decision block 209 to decision block 237, wherein a determination is made whether the last saw blade on the saw mandrel has been trained. If a determination is made at decision block 237 that the last saw blade on the saw mandrel has not been trained, exemplary method 200 proceeds from decision block 237 to step 238, wherein exemplary method 200 proceeds to step 218 of FIG. 6B, and proceeds as discussed herein. If a determination is made at decision block 237 that the last saw blade on the saw mandrel has been trained, exemplary method 200 proceeds from decision block 237 to step 239, wherein gauge 10 and bender 20 are disengaged from the saw blade 6. From step 239, exemplary method 200 proceeds to step 240, wherein exemplary method 200 stops.

Returning to decision block 217 (shown in FIG. 6B), if a determination is made that the sprocket sensor (e.g., sprocket sensor 71) has not counted a maximum number of sprocket teeth (e.g., the total number of sprocket teeth 72 on a given sprocket 70) following the last out of tolerance position along saw blade 6, exemplary method 200 proceeds from decision block 217 to step 233, wherein exemplary method 200 returns to decision block 209 of FIG. 6A, and proceeds as discussed herein.

Returning to decision block 220 (shown in FIG. 6B), if a determination is made that at least two saw blades 6 on the saw mandrel 1 have been trained, exemplary method 200 proceeds from decision block 220 to step 227, wherein exemplary method 200 proceeds to step 228 shown on FIG. 6C.

From step 228, exemplary method 200 proceeds to decision block 229, wherein a determination is made whether training of the last saw blade 6 triggered a "back-up" feature of exemplary method 200. The "back-up" feature may be triggered by one or more conditions recognized by PLC 30 including, but not limited to, bending the currently trained saw blade 6 in the direction of the immediately preceded trained saw blade 6 by a first threshold or by bending the currently trained saw blade 6 in the direction of the immediately previously trained saw by a second threshold because the proceeding saw blade 6 was bent in the direction on the next untrained saw blade 6. The backup feature provides even more accuracy given that bending in the direction of a previously trained saw blade 6 can affect the corrected saw blade 6 enough to move it out of tolerance under certain conditions. With this feature the saw blade 6 is checked and retrained if necessary. If a determination is made that training of the last saw blade 6 has triggered a "back-up" feature of exemplary method 200, exemplary method 200 proceeds from decision block 229 to step 230, wherein the programmable logic controller (e.g., PLC 30) instructs servo motor with embedded encoder 45 to start a reverse rotation of the ball screw 42, causing movable gauge/bender support member (e.g., movable support member 40) to move along the ball screw (e.g., ball screw 42) to move a reverse distance so as to be in a position to re-capture the previously trained saw blade 6 (i.e., not the last trained saw blade 6, but the one prior to the last trained saw blade 6). In this step, movable gauge/bender support member (e.g., movable support member 40) moves along the ball screw (e.g., ball screw 42) in a reverse direction a distance equal to the spacing between adjacent saw blades as determined by the PLC 30 following model/manufacture data inputted by an operator).

From step 230, exemplary method 200, proceeds to step 231, wherein the gauge 10 and bender 20 are re-engaged with the previously trained saw blade 6 to make sure that training of the last saw blade 6 did not negatively impact the training of the previously trained saw blade 6. From step 231, exemplary method 200, proceeds to step 232, wherein exemplary method 200 returns to decision block 209 and proceeds as discussed herein.

Returning to decision block 229, if a determination is made that training of the last saw blade 6 does not triggered a "back-up" feature of exemplary method 200, exemplary method 200 proceeds from decision block 229 to decision block 234, wherein a determination is made of whether the last saw blade 6 of the saw mandrel 1 has been trained. If a determination is made at decision block 234 that the last saw blade 6 of the saw mandrel 1 has not been trained, exemplary method 200 proceeds from decision block 234 to step 235, wherein exemplary method 200 returns to step 221 and proceeds as discussed herein. If a determination is made at decision block 234 that the last saw blade 6 of the saw mandrel 1 has been trained, exemplary method 200 proceeds from decision block 229 to step 236, wherein exemplary method 200 stops. The present invention is also directed to method of making the above-described apparatus for automatically training saw blades along a saw mandrel. Any conventional step may be used to form a given component of the apparatus (e.g., a thermoforming or machining step to form a metal component). A combination of conventional steps and new method steps are utilized to form the above-described apparatus for automatically training saw blades along a saw mandrel. Suitable method steps include, but are not limited to, forming any component via one or more molding/thermoforming/shaping/machining step; assembling various components with one another to form a gauge (e.g., gauge 10); incorporating a laser electronic measuring device 80 into the apparatus; assembling various components with one another to form a bender (e.g., bender 20); assembling various components with one another to form a saw mandrel support structure (e.g., saw mandrel support structure 50); connecting a servo motor with embedded encoder 45 with ball screw 42; assembling various components with one another to form saw mandrel sprocket and sprocket sensor (e.g., sprocket 70 and sensor 71); programming the programmable logic controller (e.g., PLC 30) to receive signals from various apparatus components and send instructions to various apparatus components as discussed above; connect all of the apparatus components with one another; providing one or more sources of electricity to (i) power the apparatus, and (ii) other apparatus components; and connect the complete apparatus to the one or more sources of electricity.

Additional Embodiments

The above-described methods and apparatus for automatically training saw blades along a saw mandrel are further described in the following additional embodiments:

Methods of Automatically Training Saw Blades Along a Saw Mandrel Embodiments

1. A method of automatically training saw blades along a saw mandrel, said method comprising: positioning a gauge comprising (i) a slidable base that moves longitudinally relative to and parallel with the saw mandrel and (ii) left and right gauge contact members extending from the slidable base relative to a first saw blade along the saw mandrel such that the left and right gauge contact members of the slidable base extend along and contact opposite left and right major surfaces of the first saw blade, respectively; and in response to the first saw blade being out of tolerance based on a measured position and longitudinal movement of the slidable base relative to the saw mandrel during rotation of the saw mandrel, bending the first saw blade in a right direction if the first saw blade is in a positive out of tolerance position, and (ii) bending the first saw blade in a left direction if the first saw blade is in a negative out of tolerance position, said bending being facilitated by a bender.
2. The method of embodiment 1, wherein each of the left and right gauge contact members comprises (i) a rod portion that connects each of the left and right gauge contact members to the slidable base, and (ii) a contact portion at a distal end of each rod portion away from the slidable base.
3. The method of embodiment 1 or 2, wherein at least one of the left and right gauge contact members rotates along its axis (i.e., an axis extending along the rod portion).
4. The method of any one of embodiments 1 to 3, wherein (i) one of the left and right gauge contact members is in a fixed, non-rotating position and (ii) one of the left and right gauge contact members rotates along its axis.
5. The method of any one of embodiments 2 to 4, wherein the contact portions of each of the left and right gauge contact members are in contact with one another when the gauge, the slidable base, and the left and right gauge contact members are not engaged with or in contact with the first saw blade or any other saw blade of the saw mandrel.
6. The method of any one of embodiments 2 to 5, wherein at least one of the left and right gauge contact members is spring-loaded so as to force contact of the contact portions of the left and right gauge contact members (i) with one another when the gauge, the slidable base, and the left and right gauge contact members are not engaged with or in contact with the first saw blade or any other saw blade of the saw mandrel (see, FIG. 3C), and (ii) with opposite left and right major surfaces of the first saw blade when the gauge, the slidable base, and the left and right gauge contact members are engaged with or in contact with the first saw blade or any other saw blade of the saw mandrel (see, FIG. 3D).
7. The method of any one of embodiments 2 to 6, wherein the contact portions of the left and right gauge contact members are configured to separate and slide over opposite left and right major surfaces of the first saw blade when the slidable base and the left and right gauge contact members are moved towards and engaged with the first saw blade or any other saw blade of the saw mandrel.
8. The method of any one of embodiments 1 to 7, wherein (i) the measured position of the slidable base and (ii) the longitudinal movement of the slidable base relative to the saw mandrel is determined by a laser electronic measuring device (LEMD).
9. The method of embodiment 8, wherein an actual amount of out of tolerance, both positive and negative out of tolerance, is measured by the laser electronic measuring device.
10. The method of embodiment 8 or 9, wherein the laser electronic measuring device is capable of measuring a position of the slidable base within 0.0001 inch (in).
11. The method of any one of embodiments 1 to 10, further comprising: positioning the bender relative to the first saw blade such that left and right bender contact members of the bender extend along the opposite left and right major surfaces of the first saw blade, respectively, and the first saw blade is between the left and right bender contact members; and initiating said bending step using the bender when the first saw blade is determined to be in a positive or negative out of tolerance position.
12. The method of any one of embodiments 8 to 11, wherein an amount of bending force administered by the bender is calculated by the PLC using an analog signal received from the LEMD and operator entered inputs among other parameters such as a number of corrections attempted
13. The method of any one of embodiments 1 to 12, wherein said bending takes place along the first saw blade at a location that is about 180° from a contact location at which the left and right gauge contact members are in contact the first saw blade.
14. The method of any one of embodiments 1 to 13, wherein the bender is positioned directly opposite the gauge relative to the saw mandrel such that any point along the first saw blade that is out of tolerance travels 180° during rotation of the saw mandrel so as to be positioned between the left and right bender contact members of the bender.
15. The method of any one of embodiments 1 to 14, wherein said bending takes place at up to 16 locations along the first saw blade (i.e., 16 locations separated by 22.5° along the first saw blade, 360°/16=22.5°).
16. The method of any one of embodiments 1 to 15, wherein one or more out of tolerance signals are sent to a programmable logic controller, and in response to the programmable logic controller receiving the one or more out of tolerance signals, sending a first command to the bender so as to cause the bender to bend the first saw blade (i) in the right direction if the first saw blade is in a positive out of tolerance position, or (ii) in the left direction if the first saw blade is in a negative out of tolerance position.

17. The method of embodiment 16, wherein the first command of the programmable logic controller indicates to the bender how much force should be used during said bending step based on an amount of out of tolerance of the first saw blade as measured by the laser electronic measuring device.

18. The method of embodiment 16 or 17, wherein an operator sends an initial bend command to the programmable logic controller, and the programmable logic controller instructs the bender to bend the first saw blade an initial bend amount based on the initial bend command from the operator.

19. The method of embodiment 18, wherein the initial bend amount is based on an amount of time entered on the operator screen and the degree out of tolerance.

20. The method of any one of embodiments 16 to 19, wherein the programmable logic controller sends a second signal to the gauge and bender to move away from the first saw blade when the first saw blade is determined to be within tolerance of the measured position.

21. The method of any one of embodiments 1 to 20, further comprising: in response to the first saw blade not being out of tolerance during at least one complete rotation of the saw mandrel (i.e., as measured by the laser electronic measuring device), moving the gauge and the bender away from the first saw blade such that the left and right gauge contact members of the gauge and the left and right bender contact members of the bender do not extend along or contact the opposite left and right major surfaces of the first saw blade; subsequently moving the gauge and the bender longitudinally along the saw mandrel a distance equal to a spacing between adjacent saw blades; and moving the gauge and the bender toward a second saw blade of the saw mandrel such that (i) the left and right gauge contact members of the slidable base extend along and contact opposite left and right major surfaces of the second saw blade, and (ii) left and right bender contact members of the bender extend along opposite left and right major surfaces of the second saw blade.

22. The method of embodiment 21, wherein a servo motor and encoder are used to move the gauge and the bender longitudinally along the saw mandrel.

23. The method of embodiment 22, wherein the encoder comprises a 10000 count per revolution encoder.

24. The method of embodiment 22 or 23, wherein a gear box is used in combination with the servo motor and encoder.

25. The method of embodiment 24, wherein the gear box is a 5:1 gear box.

26. The method of any one of embodiments 22 to 25, wherein the servo motor and encoder are capable of moving the gauge and the bender longitudinally relative to the saw mandrel in distance increments of about 0.000004 in.

27. The method of any one of embodiments 21 to 25, wherein the gauge and the bender are movable longitudinally along the saw mandrel via a ball screw positioned parallel to the saw mandrel.

28. The method of embodiment 27, wherein the ball screw has a pitch of 0.2 in per revolution.

29. The method of any one of embodiments 21 to 28, wherein the spacing between adjacent saw blades is inputted into the programmable logic controller based on a model/manufacturer of the saw mandrel.

30. The method of any one of embodiments 21 to 29, wherein an operator provides a model/manufacturer of the saw mandrel to the programmable logic controller, and the programmable logic controller performs one or more of: (i) determines the spacing between adjacent saw blades, (ii) determines a number of encoder increments, and (iii) calculates a number of counts on the encoder to move the gauge and bender a desired distance.

31. The method of any one of embodiments 21 to 30, wherein the above method steps are performed on the second saw blade.

32. The method of any one of embodiments 21 to 31, further comprising: in response to the second saw blade not being out of tolerance during at least one complete rotation of the saw mandrel (i.e., as measured by the laser electronic measuring device), moving the gauge and the bender away from the second saw blade such that the left and right gauge contact members of the gauge and the left and right bender contact members of the bender do not extend along or contact the opposite left and right major surfaces of the second saw blade; subsequently moving the gauge and the bender along the saw mandrel a distance equal to the spacing between adjacent saw blades; and moving the gauge and the bender toward a next saw blade of the saw mandrel such that (i) the left and right gauge contact members of the slidable base extend along and contact opposite left and right major surfaces of the next saw blade, and (ii) left and right bender contact members of the bender extend along opposite left and right major surfaces of the next saw blade.

33. The method of any one of embodiments 21 to 32, further comprising: in response to one or more conditions being met, moving the gauge and the bender away from a recently trained saw blade such that the left and right gauge contact members of the gauge and the left and right bender contact members of the bender do not extend along or contact the opposite left and right major surfaces of the recently trained saw blade; moving the gauge and the bender along the saw mandrel in a reverse direction a distance equal to the spacing between adjacent saw blades; moving the gauge and the bender toward a previously trained saw blade of the saw mandrel such that (i) the left and right gauge contact members of the slidable base extend along and contact opposite left and right major surfaces of the previously trained saw blade, and (ii) left and right bender contact members of the bender extend along opposite left and right major surfaces of the previously trained saw blade; and re-training the previously trained saw blade.

34. The method of embodiment 33, wherein the one or more conditions comprise at least one of: bending the recently trained saw blade by more than a first threshold amount in a direction of an immediate previously trained blade, bending the currently trained saw blade towards the previously trained saw blade by more than a second threshold amount, and bending the previously trained blade towards the next untrained blade by a third threshold amount.

Apparatus Embodiments

35. An apparatus for performing the method of any one of embodiments 1 to 34, said apparatus comprising: the gauge comprising (i) the slidable base that moves longitudinally relative to and parallel with the saw mandrel and (ii) the left and right gauge contact members extending from the slidable base; the bender comprising left and right bender contact members; the laser electronic measuring device (LEMD); and an apparatus component operatively adapted to move the gauge, the bender, and the laser electronic measuring device (LEMD) longitudinally and parallel relative to the saw mandrel.

36. An apparatus for performing the method of embodiment 35, said apparatus further comprising: a support structure operatively adapted to support and allow rotation of a saw mandrel; a motor and associated connecting components operatively adapted to rotate the saw mandrel; and the programmable logic controller.

37. An apparatus for performing the method of embodiment 35 or 36, said apparatus further comprising: the servo motor and encoder used to move the gauge, the bender and the laser electronic measuring device (LEMD) longitudinally relative and parallel to the saw mandrel.

38. An apparatus for automatically training saw blades along a saw mandrel, said apparatus comprising: a gauge comprising (i) a slidable base that moves longitudinally relative to and parallel with a saw mandrel and (ii) left and right gauge contact members extending from the slidable base, said left and right gauge contact members being positionable along opposite left and right major surfaces of a first saw blade positioned along the saw mandrel such that teeth (or just past the teeth) of the first saw blade are "captured" between the left and right gauge contact members; a bender comprising left and right bender contact members, said left and right bender contact members being spaced from one another so as to be positionable on opposite left and right major surfaces of the first saw blade such that teeth of the first saw blade are between the left and right bender contact members; and a laser electronic measuring device (LEMD) that (i) determines a measured position of the slidable base and (ii) detects longitudinal movement of the slidable base relative to the saw mandrel, wherein in response to the first saw blade being out of tolerance based on the measured position and longitudinal movement of the slidable base relative to the saw mandrel, as measured by the laser electronic measuring device, during rotation of the saw mandrel, said bender being operatively adapted to (i) bend the first saw blade in a right direction if the first saw blade is in a positive out of tolerance position, and (ii) bend the first saw blade in a left direction if the first saw blade is in a negative out of tolerance position.

39. The apparatus of embodiment 38, wherein the bender is positioned directly opposite the gauge relative to the saw mandrel such that any point along the first saw blade that is out of tolerance travels 180° during rotation of the saw mandrel so as to be positioned between the left and right bender contact members of the bender.

40. The apparatus of embodiment 38 or 39, further comprising: one or more apparatus components operatively adapted to move the gauge and the bender toward or away from the first saw blade.

41. The apparatus of any one of embodiments 38 to 40, further comprising: a support structure operatively adapted to support and allow rotation of a saw mandrel; a first motor and associated connecting components operatively adapted to rotate the saw mandrel when positioned within the support structure; a ball screw extending parallel to the saw mandrel when positioned within the support structure; and a movable support structure operatively adapted to (i) support the gauge, the bender and the laser electronic measuring device, and (ii) move along the ball screw.

42. The apparatus of any one of embodiments 38 to 41, further comprising: a servo motor and encoder for moving the movable support structure along the ball screw.

43. The apparatus of any one of embodiments 38 to 42, further comprising: a sprocket coaxially positioned along the saw mandrel; and a sprocket sensor operatively adapted to detect a rotating position along said sprocket relative to said sprocket sensor.

44. The apparatus of any one of embodiments 38 to 43, further comprising: a programmable logic controller operatively adapted to receive one or more out of tolerance signals from the laser electronic measuring device, and in response to receiving the one or more out of tolerance signals, sending a first command to the bender so as to cause the bender to (i) bend the first saw blade in a right direction if the first saw blade is in a positive out of tolerance position, and (ii) bend the first saw blade in a left direction if the first saw blade is in a negative out of tolerance position.

45. The apparatus of any one of embodiments 38 to 44, wherein the bender is positioned directly opposite the gauge relative to the saw mandrel such that a contact point along the first saw blade that is found to be out of tolerance travels 180° during rotation of the saw mandrel so as to be positioned between the left and right bender contact members of the bender.

46. The apparatus of any one of embodiments 38 to 45, wherein each of the left and right gauge contact members comprises (i) a rod portion that connects each of the left and right gauge contact members to the slidable base, and (ii) a contact portion at a distal end of each rod portion away from the slidable base.

47. The apparatus of any one of embodiments 38 to 46, wherein at least one of the left and right gauge contact members rotates along its axis (i.e., an axis extending along the rod portion).

48. The apparatus of any one of embodiments 38 to 47, wherein (i) one of the left and right gauge contact members is in a fixed, non-rotating position and (ii) one of the left and right gauge contact members rotates along its axis.

49. The apparatus of any one of embodiments 46 to 48, wherein the contact portions of each of the left and right gauge contact members are in contact with one another when the gauge, the slidable base, and the left and right gauge contact members are not engaged with or in contact with the first saw blade or any other saw blade of the saw mandrel.

50. The apparatus of any one of embodiments 46 to 49, wherein at least one of the left and right gauge contact members is spring-loaded so as to force contact of the contact portions of the left and right gauge contact members (i) with one another when the gauge, the slidable base, and the left and right gauge contact members are not engaged with or in contact with the first saw blade or any other saw blade of the saw mandrel, and (ii) with opposite left and right major surfaces of the first saw blade when the gauge, the slidable base, and the left and right gauge contact members are engaged with or in contact with the first saw blade or any other saw blade of the saw mandrel.

51. The apparatus of any one of embodiments 46 to 50, wherein the contact portions of the left and right gauge contact members are configured to separate and slide over opposite left and right major surfaces of the first saw blade when the slidable base and the left and right gauge contact members are moved towards and engaged with the first saw blade or any other saw blade of the saw mandrel.

52. The apparatus of any one of embodiments 38 to 51, wherein an actual amount of out of tolerance, both positive and negative out of tolerance, is measured by the laser electronic measuring device.

53. The apparatus of any one of embodiments 38 to 52, wherein the laser electronic measuring device is capable of measuring a position of the slidable base within 0.0001 inch (in).

54. The apparatus of any one of embodiments 38 to 53, wherein an amount of bending force administered by the bender is calculated by the PLC using out of tolerance signal data from the LEMD, operator inputs, and number of attempts for correction.

55. The apparatus of any one of embodiments 38 to 54, wherein said bender bends the first saw blade at up to 16 bend locations along the first saw blade (i.e., 16 locations separated by 22.5° along the first saw blade, 360°/16=22.5°).

56. The apparatus of any one of embodiments 44 to 55, wherein the programmable logic controller instructs the bender to apply a bend force at a bend location along the first saw blade based on an amount of out of tolerance of the first saw blade as measured by the laser electronic measuring device.

57. The apparatus of any one of embodiments 44 to 56, further comprising an input display that enables an operator to input an initial bend command to the programmable logic controller, and the programmable logic controller instructs the bender to bend the first saw blade an initial bend amount based on the initial bend command from the operator.

58. The apparatus of embodiment 57, wherein the initial bend amount is based on an amount of out of tolerance of the first saw blade as noted by the operator and as measured by the laser electronic measuring device.

59. The apparatus of any one of embodiments 44 to 58, wherein the programmable logic controller sends a second signal to the gauge and bender to move away from the first saw blade when the first saw blade is determined to be within tolerance of the measured position.

60. The apparatus of any one of embodiments 42 to 59, wherein the encoder on the servo motor comprises a 10000 count per revolution encoder.

61. The apparatus of any one of embodiments 42 to 60, wherein a gear box is used in combination with the servo motor and encoder.

62. The apparatus of embodiment 61, wherein the gear box is a 5:1 gear box.

63. The apparatus of any one of embodiments 42 to 62, wherein the servo motor and encoder are capable of moving the gauge and the bender longitudinally relative to the saw mandrel in distance increments of about 0.000004 in.

64. The apparatus of any one of embodiments 41 to 63, wherein the ball screw has a pitch of 0.2 in per revolution.

65. The apparatus of any one of embodiments 44 to 64, wherein the programmable logic controller is programmable to receive a model/manufacturer of the saw mandrel from an operator and subsequently performs one or more of: (i) determines a spacing between adjacent saw blades for the model/manufacturer, (ii) determines a number of encoder increments for the model/manufacturer, and (iii) calculates a number of counts on the encoder to move the gauge and bender a desired distance.

66. The apparatus of any one of embodiments 44 to 65, wherein the programmable logic controller is programmable to, in response to one or more conditions being met, (i) move the gauge and the bender away from a recently trained saw blade such that the left and right gauge contact members of the gauge and the left and right bender contact members of the bender do not extend along or contact the opposite left and right major surfaces of the recently trained saw blade; (ii) move the gauge and the bender along the saw mandrel in a reverse direction a distance equal to a spacing between adjacent saw blades; (iii) move the gauge and the bender toward a previously trained saw blade of the saw mandrel such that (a) the left and right gauge contact members of the slidable base extend along and contact opposite left and right major surfaces of the previously trained saw blade, and (b) left and right bender contact members of the bender extend along opposite left and right major surfaces of the previously trained saw blade; and (iv) re-training the previously trained saw blade.

67. The apparatus of embodiment 66, wherein the one or more conditions comprise at least one of: bending the recently trained saw blade by more than a first threshold amount, bending the recently trained saw blade towards the previously trained saw blade by more than a second threshold amount, bending each of the recently trained saw blade and the previously trained saw blade in the same direction by a third threshold amount, or any combination thereof.

It should be understood that although the above-described apparatus and methods are described as "comprising" one or more components or steps, the above-described apparatus and methods may "comprise," "consists of," or "consist essentially of" any of the above-described components or steps of the apparatus and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, an apparatus and/or method that "comprises" a list of elements (e.g., components or steps) is not necessarily limited to only those elements (or components or steps), but may include other elements (or components or steps) not expressly listed or inherent to the apparatus and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define apparatus and methods that include materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described apparatus and methods may comprise, consist essentially of, or consist of any of the herein-described components, features and steps, as shown in the figures with or without any feature(s) not shown in the figures. In other words, in some embodiments, the apparatus and/or methods of the present invention do not have any additional features other than those shown in the figures, and such additional features, not shown in the figures, are specifically excluded from the apparatus and/or methods. In other embodiments, the apparatus and/or methods of the present invention do have one or more additional features that are not shown in the figures.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Training of Saw Blades on Saw Mandrels

An exemplary apparatus as shown in FIGS. 1-5B and described herein was prepared using multiple method steps (e.g., one or more assembling steps, etc.) as described above. The exemplary apparatus was used to efficiency and effectively train saw blades along a variety of saw mandrels using the method steps as described herein.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of automatically training saw blades along a saw mandrel, said method comprising:
   positioning a gauge comprising (i) a slidable base that moves longitudinally relative to and parallel with the saw mandrel and (ii) left and right gauge contact members extending from the slidable base relative to a first saw blade along the saw mandrel such that the left and right gauge contact members of the slidable base extend along and contact opposite left and right major surfaces of the first saw blade, respectively; and
   in response to the first saw blade being out of tolerance based on a measured position and longitudinal movement of the slidable base relative to the saw mandrel during rotation of the saw mandrel,
      bending the first saw blade in a right direction if the first saw blade is in a positive out of tolerance position, and (ii) bending the first saw blade in a left direction if the first saw blade is in a negative out of tolerance position, said bending being facilitated by a bender.

2. The method of claim 1, wherein each of the left and right gauge contact members comprises (i) a rod portion that connects each of the left and right gauge contact members to the slidable base, and (ii) a contact portion at a distal end of each rod portion away from the slidable base.

3. The method of claim 1, wherein (i) one of the left and right gauge contact members is in a fixed, non-rotating position and (ii) one of the left and right gauge contact members rotates along its axis.

4. The method of claim 2, wherein the contact portions of the left and right gauge contact members (i) are in contact with one another when the gauge, the slidable base, and the left and right gauge contact members are not engaged with or in contact with the first saw blade or any other saw blade of the saw mandrel, and (ii) are in contact with opposite left and right major surfaces of the first saw blade when the gauge, the slidable base, and the left and right gauge contact members are engaged with or in contact with the first saw blade or any other saw blade of the saw mandrel.

5. The method of claim 1, wherein (i) the measured position of the slidable base and (ii) the longitudinal movement of the slidable base relative to the saw mandrel is determined by a laser electronic measuring device (LEMD).

6. The method of claim 5, wherein an actual amount of out of tolerance, both positive and negative out of tolerance, is measured by the laser electronic measuring device.

7. The method of claim 5, wherein the laser electronic measuring device is capable of measuring a position of the slidable base within 0.0001 inch (in).

8. The method of claim 5, wherein an amount of bending force administered by the bender is calculated by a programmable logic controller (PLC) using an analog signal received from the LEMD and operator entered inputs among other parameters such as a number of corrections attempted.

9. The method of claim 1, wherein one or more out of tolerance signals are sent to a programmable logic controller, and
   in response to the programmable logic controller receiving the one or more out of tolerance signals,
      sending a first command to the bender so as to cause the bender to bend the first saw blade (i) in the right direction if the first saw blade is in a positive out of tolerance position, or (ii) in the left direction if the first saw blade is in a negative out of tolerance position.

10. The method of claim 1, further comprising:
in response to the first saw blade not being out of tolerance during at least one complete rotation of the saw mandrel,
   moving the gauge and the bender away from the first saw blade such that the left and right gauge contact members of the gauge and the left and right bender contact members of the bender do not extend along or contact the opposite left and right major surfaces of the first saw blade;
   subsequently moving the gauge and the bender longitudinally along the saw mandrel a distance equal to a spacing between adjacent saw blades; and
   moving the gauge and the bender toward a second saw blade of the saw mandrel such that (i) the left and right gauge contact members of the slidable base extend along and contact opposite left and right major surfaces of the second saw blade, and (ii) left and right bender contact members of the bender extend along opposite left and right major surfaces of the second saw blade.

11. The method of claim 1, further comprising:
in response to one or more conditions being met,
   moving the gauge and the bender away from a recently trained saw blade such that the left and right gauge contact members of the gauge and the left and right bender contact members of the bender do not extend along or contact the opposite left and right major surfaces of the recently trained saw blade;
   moving the gauge and the bender along the saw mandrel in a reverse direction a distance equal to the spacing between adjacent saw blades;
   moving the gauge and the bender toward a previously trained saw blade of the saw mandrel such that (i) the left and right gauge contact members of the slidable base extend along and contact opposite left and right major surfaces of the previously trained saw blade, and (ii) left and right bender contact members of the bender extend along opposite left and right major surfaces of the previously trained saw blade; and
   re-training the previously trained saw blade.

12. The method of claim 11, wherein the one or more conditions comprise at least one of: bending the recently trained saw blade by more than a first threshold amount in a direction of an immediate previously trained blade, bending the currently trained saw blade towards the previously trained saw blade by more than a second threshold amount, and bending the previously trained blade towards the next untrained blade by a third threshold amount.

13. An apparatus for performing the method of claim 5, said apparatus comprising:
the gauge comprising (i) the slidable base that moves longitudinally relative to and parallel with the saw mandrel and (ii) the left and right gauge contact members extending from the slidable base;
the bender comprising left and right bender contact members;
the laser electronic measuring device (LEMD); and
an apparatus component operatively adapted to move the gauge, the bender, and the laser electronic measuring device (LEMD) longitudinally and parallel relative to the saw mandrel.

14. An apparatus of claim 13, said apparatus further comprising:
a support structure operatively adapted to support and allow rotation of a saw mandrel;
a motor and associated connecting components operatively adapted to rotate the saw mandrel; and
the programmable logic controller.

15. An apparatus of claim 14, said apparatus further comprising:
the servo motor and encoder used to move the gauge, the bender and the laser electronic measuring device (LEMD) longitudinally relative and parallel to the saw mandrel.

16. An apparatus for automatically training saw blades along a saw mandrel, said apparatus comprising:
a gauge comprising (i) a slidable base that moves longitudinally relative to and parallel with a saw mandrel and (ii) left and right gauge contact members extending from the slidable base, said left and right gauge contact members being positionable along opposite left and right major surfaces of a first saw blade positioned along the saw mandrel such that the first saw blade is engaged with the left and right gauge contact members;
a bender comprising left and right bender contact members, said left and right bender contact members being spaced from one another so as to be positionable on opposite left and right major surfaces of the first saw blade such that teeth of the first saw blade are between the left and right bender contact members; and
a laser electronic measuring device (LEMD) that (i) determines a measured position of the slidable base and (ii) detects longitudinal movement of the slidable base relative to the saw mandrel,
wherein in response to the first saw blade being out of tolerance based on the measured position and longitudinal movement of the slidable base relative to the saw mandrel, as measured by the laser electronic measuring device, during rotation of the saw mandrel, said bender being operatively adapted to (i) bend the first saw blade in a right direction if the first saw blade is in a positive out of tolerance position, and (ii) bend the first saw blade in a left direction if the first saw blade is in a negative out of tolerance position.

17. The apparatus of claim 16, further comprising:
a support structure operatively adapted to support and allow rotation of a saw mandrel;
a first motor and associated connecting components operatively adapted to rotate the saw mandrel when positioned within the support structure;
a ball screw extending parallel to the saw mandrel when positioned within the support structure; and
a movable support structure operatively adapted to (i) support the gauge, the bender and the laser electronic measuring device, and (ii) move along the ball screw.

18. The apparatus of claim 16, further comprising:
a servo motor and encoder for moving the movable support structure along the ball screw.

19. The apparatus of claim 16, further comprising:
a programmable logic controller operatively adapted to receive one or more out of tolerance signals from the laser electronic measuring device, and in response to receiving the one or more out of tolerance signals, sending a first command to the bender so as to cause the bender to (i) bend the first saw blade in a right direction if the first saw blade is in a positive out of tolerance position, and (ii) bend the first saw blade in a left direction if the first saw blade is in a negative out of tolerance position.

20. The apparatus of claim 16, wherein the programmable logic controller is programmable to, in response to one or more conditions being met, (i) move the gauge and the bender away from a recently trained saw blade such that the left and right gauge contact members of the gauge and the left and right bender contact members of the bender do not extend along or contact the opposite left and right major surfaces of the recently trained saw blade; (ii) move the gauge and the bender along the saw mandrel in a reverse direction a distance equal to a spacing between adjacent saw blades; (iii) move the gauge and the bender toward a previously trained saw blade of the saw mandrel such that (a) the left and right gauge contact members of the slidable base extend along and contact opposite left and right major surfaces of the previously trained saw blade, and (b) left and right bender contact members of the bender extend along opposite left and right major surfaces of the previously trained saw blade; and (iv) re-training the previously trained saw blade;
wherein the one or more conditions comprise at least one of: bending the recently trained saw blade by more than a first threshold amount, bending the recently trained saw blade towards the previously trained saw blade by more than a second threshold amount, bending each of the recently trained saw blade and the previously trained saw blade in the same direction by a third threshold amount, or any combination thereof.

* * * * *